United States Patent
Deming et al.

(10) Patent No.: US 6,535,216 B1
(45) Date of Patent: Mar. 18, 2003

(54) MULTI-PROCESSOR GRAPHICS ACCELERATOR

(75) Inventors: James L. Deming, Madison, AL (US); Matt E. Buckelew, Madison, AL (US); Clifford A. Whitmore, Huntsville, AL (US); Steven J. Heinrich, Huntsville, AL (US); Dale L. Kirkland, Madison, AL (US); Timothy S. Johnson, Huntsville, AL (US)

(73) Assignee: 3DLabs, Inc., Ltd., Hamilton (BM)

( * ) Notice: Subject to any disclaimer, the term of this patent is extended or adjusted under 35 U.S.C. 154(b) by 0 days.

(21) Appl. No.: 10/136,585

(22) Filed: May 1, 2002

(Under 37 CFR 1.47)

Related U.S. Application Data

(62) Division of application No. 09/353,495, filed on Jul. 15, 1999.
(60) Provisional application No. 60/093,247, filed on Jul. 17, 1998.

(51) Int. Cl.[7] ................................................ G06F 15/16
(52) U.S. Cl. ....................................... 345/502; 345/581
(58) Field of Search ................................. 345/502, 505, 345/584, 582, 441–443, 581

(56) References Cited

U.S. PATENT DOCUMENTS

| | | | | |
|---|---|---|---|---|
| 5,293,480 A | * | 3/1994 | Miller et al. ................. | 345/502 |
| 5,787,233 A | * | 7/1998 | Akimoto ...................... | 700/246 |
| 6,078,334 A | * | 6/2000 | Hanaoka et al. ............. | 345/584 |
| 6,157,393 A | * | 12/2000 | Potter et al. ................. | 345/505 |

* cited by examiner

Primary Examiner—Kee M. Tung
(74) Attorney, Agent, or Firm—Arnall Golden Gregory LLP

(57) ABSTRACT

An apparatus for displaying a polygon on a horizontal scan display device having a plurality of pixels includes first and second rasterizers that each process respective first and second sets of pixels. Each set of pixels includes vertical stripes that are transverse to the horizontal scan of the display. To that end, the first rasterizer has an input for receiving polygon data relating to the polygon. The first rasterizer determines a first set of pixels that are to be lit for display of the polygon, and also determines display characteristics of the first set of pixels. In a similar manner, the second rasterizer also includes an input for receiving polygon data relating to the polygon. The second rasterizer similarly determines a second set of pixels that are to be lit for display of the polygon, and also determines display characteristics of the second set of pixels. The first and second sets of pixels have no common pixels and are vertical stripes of pixels on the display device that are transverse to the direction of the horizontal scan.

10 Claims, 18 Drawing Sheets

MULTI-PROCESSOR GRAPHICS ACCELERATOR

CROSS REFERENCE TO OTHER APPLICATIONS

This application is a divisional application from the copending U.S. patent application Ser. No. 09/353,495, filed on Jul. 15, 1999, and claims priority from U.S. provisional patent application Serial No. 60/093,247, filed Jul. 17, 1998, entitled "MULTI-PROCESSOR GRAPHICS ACCELERATOR," the disclosure of which is incorporated herein; in its entirety, by reference.

FIELD OF THE INVENTION

The invention generally relates to computer graphics processing and, more particularly, the invention relates to graphics accelerators having parallel processors.

BACKGROUND OF THE INVENTION

Graphics rendering devices commonly include parallel processors for improving processing speed. In some prior art systems, each parallel processor processes data for a relatively large preselected contiguous portion of a display device. For example, in a four parallel processor graphics accelerator, each processor may produce pixel data for one quadrant of the display device. Accordingly, when an image to be drawn is substantially within one of the quadrants of the display, only one processor is processing while the other processors remain relatively dormant. This can significantly slow system speed, thus decreasing system efficiency.

Other problems commonly arise in multi-parallel processor graphics accelerators such as, for example, graphics requests being processed out of a prescribed sequential order. When this happens, the processors often produce output pixel data that is out of sequence and thus, not an accurate depiction of the image being drawn. It therefore would be desirable to provide a parallel processing graphics accelerator that divides processing more evenly among the processors, while also maintaining the order of sequential graphics requests that ultimately are transformed into pixel data.

SUMMARY OF THE INVENTION

In accordance with one aspect of the invention, an apparatus for displaying a polygon on a horizontal scan display device having a plurality of pixels includes first and second rasterizers that each process respective first and second sets of pixels. Each set of pixels includes vertical stripes that are transverse to the horizontal scan of the display. To that end, the first rasterizer has an input for receiving polygon data relating to the polygon. The first rasterizer determines a first set of pixels that are to be lit for display of the polygon, and also determines display characteristics of the first set of pixels. In a similar manner, the second rasterizer also includes an input for receiving polygon data relating to the polygon. The second rasterizer similarly determines a second set of pixels that are to be lit for display of the polygon, and also determines display characteristics of the second set of pixels. The first and second sets of pixels have no common pixels and are vertical stripes of pixels on the display device that are transverse to the direction of the horizontal scan. In alternative embodiments, the display device has an arbitrary scan direction and the stripes are transverse to the arbitrary scan direction.

In preferred embodiments, the apparatus is a graphics accelerator having a first and second frame buffers, and first and second resolvers for transferring the display characteristics for the first and second sets of pixels into the first and second frame buffers, respectively. The first and second frame buffers may be formed on the same integrated circuit, or may be formed on different integrated circuits. In preferred embodiments, the first and second resolvers each include a plurality of resolvers. More particularly, the first resolver may include a first number of sub-resolvers, and the first frame buffer may be divided into a second number of frame buffer segments. Each sub-resolver may be assigned one frame buffer segment for exclusive use and thus, cannot transfer pixel data into other frame buffer segments. Each subresolver thus writes to its assigned frame buffer segment only.

In other embodiments, the first resolver includes first and second sub-resolvers. The first sub-resolver transfers display characteristics of a first sub-set of pixels to the first frame buffer while the second sub-resolver transfers display characteristics of a second sub-set of pixels to the first frame buffer. The pixels in the first and second sub-sets are members of the first set of pixels and each have pixels in the same vertical stripe.

In preferred embodiments, each vertical stripe includes a plurality of contiguous pixels. The first set of pixels includes a plurality of non-contiguous vertical stripes. The second set of pixels may include a plurality of non-contiguous vertical stripes. In some embodiments, each vertical stripe has a width of one pixel. Among other things, the display characteristics may include intensity information, color data, depth data, and transparency data.

The polygon data may include vertex data. In some embodiments, the vertex data define a triangle.

In accordance with another aspect of the invention, an apparatus for displaying an image (comprised of a plurality of polygons) on a display device having a plurality of pixels includes first and second gradient producing units that broadcast ordered sets of data in a preselected order to a bus. This preselected order maintains the order of the ordered sets of data.

Accordingly, in prefer-ed embodiments of the invention, the apparatus includes the first and second gradient producing units, and the bus coupled to each of the gradient producing units for receiving the data broadcast. To that end, the first gradient producing unit has an input for receiving a first ordered set of polygons, where each polygon in the first ordered set is received in a first order. In a similar manner, the second gradient producing unit has an input for receiving a second ordered set of polygons, where each polygon in the second ordered set is received in a second order. The first and second gradient producing units each having respective outputs for respectively providing gradient data for the first and second set of polygons. Each polygon in the first and second ordered sets are members of the set of polygons. The bus is coupled to both the outputs of the first and second gradient producing units, and at least one rasterizer that processes the plurality of polygons for display on the display device. The first gradient producing unit output broadcasts the gradient data for the first ordered set of polygons in the first order. In a similar manner, the second gradient producing unit output broadcasts the gradient data for the second ordered set of polygons in the second order. In preferred embodiments of the invention, the second gradient producing unit output broadcasts the gradient data for the second ordered set of polygons after the gradient data of each polygon in the first ordered set of polygons is broadcasted to the bus.

In other embodiments, the apparatus for displaying an image includes a first rasterizer having an input for receiving the first ordered set of polygons, and a second rasterizer that also has an input for receiving the first ordered set of polygons. The first rasterizer determines a first set of pixels that are to be lit for display of each polygon in the first set of ordered polygons. In a similar manner, the second rasterizer also determines a second set of pixels that are to be lit for display of each polygon in the first set of ordered polygons. The first set of pixels and second set of pixels have no common pixels, while the first set of pixels and second set of pixels each are vertical stripes of pixels on the display device. Each vertical stripe preferably includes a plurality of contiguous pixels. The first set of pixels preferably includes a plurality of non-contiguous vertical stripes, while the second set of pixels also includes a plurality of non-contiguous stripes.

The first gradient producing unit preferably produces gradient values for each polygon in the first ordered set of polygons. The polygons in the set preferably are triangles having vertices and data relating to the vertices. The apparatus for drawing an image preferably is a graphics accelerator that draws the image in three dimensions (i.e., "3D").

In accordance with yet another aspect of the invention, a graphics accelerator for processing a graphics request stream includes first and second processors that each maintain control of a bus (at different times) until a flag is received at the end of the graphics request stream. To that end, the first processor includes a first input for receiving a first portion of the graphics request stream, and a first output for delivering a first unit output. In a similar manner, the second processor includes a second input for receiving a second portion of the graphics request stream, and a second output for delivering a second unit output. The bus is coupled with the first and second outputs and is configured to be controlled at a single time by no more than one processor. The first and second processors are arranged in a peer-to-peer configuration to process the graphics request stream on a cyclical basis. After gaining control of the bus, the first processor maintains exclusive control of the bus until a flag is received at the end of the first portion of the graphics request stream. No other processor can deliver output data to the bus when the first processor controls the bus.

In preferred embodiments, after the flag is received at the end of the first portion of the graphics request stream, the first processor transmits a message to the second processor. The message enables the second processor to control the bus. In preferred embodiments, the message includes a token.

In other embodiments, the graphics accelerator includes at least one additional processor. Each additional processor preferably includes an input for receiving an additional portion of the graphics request stream, and an output coupled with the bus. The first, second, and additional processors are arranged in a peer-to-peer configuration to process the graphics request stream on a cyclical basis. After gaining control of the bus, each additional processor maintains exclusive control of the bus until a flag is received at the end of the additional portion of the graphics request stream. More particularly, when one of the additional processors gains control of the bus, it maintains control of the bus until a flag is received at the end of the additional portion of the graphics request stream that such one additional processor is processing.

In preferred embodiments of the graphics accelerator, the flag includes the well known floating point value "Not a Number." In other embodiments, the flag includes a bit that, when set to a first value and read by the first processor while controlling the bus, causes the first processor to maintain control of the bus. In other embodiments, the flag includes at least one bit that, when set to a second value and read by the first processor while controlling the bus, causes the first processor to enable the second processor to control the bus. The first value and the second value may be one and zero values, respectively, in one embodiment. In another embodiment, the first value and second value are zero and one, respectively.

In yet another embodiment of the graphics accelerator, the graphics request stream includes a set of polygon strips that are arranged in a preselected order. The first portion of the graphics request stream includes a first subset of the set of polygon strips, while the second portion of the graphics request stream includes a second subset of the set of polygon strips. The first subset precedes the second subset in the preselected order.

In accordance with still another aspect of the invention, a graphics accelerator includes a plurality of processors, where each processor has an input for receiving successive graphics requests, and an output for transmitting unit output data. The processors are arranged in a peer-to-peer configuration to process each successive graphics request on a cyclical basis, where each successive graphics request is terminated by a flag. The accelerator further includes a bus coupled with the output of each process to receive unit output data, where the bus is configured to be controlled by no more than one processor at a single time. When controlling the bus, a given processor maintains control unless the given unit detects that the flag in a given graphics request (that the given processor is processing) is set to a first value.

In accordance with still another aspect of the invention, a device for managing the communication of a sequence of data records associated with successive vertices, in a graphics accelerator having a plurality of processors coupled to an output bus in a peer-to-peer configuration, utilizes a flag to control bus access by the processors. To that end, the sequence of data records are placed in a data stream for receipt by the plurality of processors. A plurality of terminator data records are placed in the data stream between selected data records. Each terminator record further includes a flag that, when set and received by a given processor controlling the bus, causes the given processor to relinquish control of the bus to a second processor. Each record may include a floating point value providing at least a first datum associated with a vertex. The terminator data records each may have a floating point value where the first datum is set to a value corresponding to Not a Number. In other embodiments, the given processor may be controlled to transmit a token to the second processor upon receipt of the flag.

In other embodiments, the given processor does not relinquish control of the bus. In accordance with still another aspect of the invention, pass-through commands are managed by processors coupled to a bus on a graphics accelerator by first enabling a master processor to transmit the command, and then subsequently causing a processor that was interrupted by the command to resume control of the bus. To that end, the processors each have inputs for receiving a sequential stream of graphics request, and outputs that are coupled to the bus. The processors are arranged in a peer-to-peer configuration to process each successive graphics request on a cyclical basis. One of the processors is designated the master processor to transmit the pass-through command. Accordingly, when a pass through command is received at the input of one of the plurality of processors (the "receiving processor"), it is determined if the receiving processor is the master processor. If it is determined that the receiving processor is not the master processor, then control of the bus is passed to the master processor. Upon control of the bus, the master processor is controlled to transmit the pass through command. In addition, if it is determined that the receiving processor is not the master processor, then the receiving processor is the first of the plurality of processors to control the bus after the pass through command is transmitted.

In preferred embodiments, the plurality of processors pass a control token sequentially therebetween to pass control of the bus from processor to processor. In such embodiment, the control token is transmitted from the receiving processor to the master processor to enable the master processor to control the bus. The plurality of processors may include an intermediate processor between the master processor and the receiving processor. In such case, the control token is transmitted from the receiving processor to the master processor via the intermediate processor. Since the processors are in a peer-to-peer configuration, no external processor or logic device is necessary to control processor operations. The plurality of processors thus are self-controlling via the token passing mechanism. In preferred embodiments, the processors are gradient producing units. In accordance with other aspects of the invention, a polygon is displayed on a horizontal scan device having a plurality of pixels by dividing the polygon into a plurality of vertical stripes that are transverse to the horizontal scan of the display device, and then calculating attribute data for each of the pixels on a stripe by stripe basis. More specifically, after the polygon is divided into stripes, pixel attribute data is received for a first pixel in a first stripe of the polygon. Each of the remaining vertical stripes have an initial pixel that corresponds to the first pixel in the first stripe. For example, if the first pixel is the bottom pixel of the first stripe, then each of the other stripes have an initial pixel that is the bottom pixel of such respective stripes. Gradient data relating to the degree of change of pixel attribute data with respect to the received pixel data (relating to the first pixel) also is received. Based upon the received data, pixel attribute data then is calculated for each initial pixel in each stripe in the polygon. Once the pixel attribute data is calculated for each initial pixel, then pixel attribute data for each remaining pixel in each stripe is calculated based upon the pixel attribute data for the initial pixel in each stripe in the polygon.

In preferred embodiments, the polygon is a triangle. Pixel attribute data for each remaining pixel in the first stripe may be calculated based upon both the pixel attribute data for the first pixel in the first stripe, and the gradient data.

It should be noted that although this and other aspects of the invention relate to horizontal scan display devices, other scan devices may be utilized. In many aspects of the invention, the vertical stripes must be transverse to the scan of the display device, regardless of whether it is horizontal scan or other scan.

In accordance with still other aspects of the invention, vertical stripes are utilized for calculating pixel values for a triangle to be displayed on a display device having a plurality of pixels that each are addressable in an X direction and a Y direction. To that end, a first number of processors are provided for calculating pixel attribute data for each pixel in the triangle. The triangle is divided into a set of vertical stripes that are perpendicular to a scan direction of the display device. Each stripe is originated from a longest edge of the triangle, where each processor calculates attribute data for different sub-sets of stripes. No two processors process the same stripe. Attribute data for an initial pixel in a first stripe is received for determining other pixel data attributes. Other pixel data attributes are calculated by traversing along the longest edge of the triangle for a first distance until a first pixel the X direction of a next contiguous stripe is detected. The first distance then is multiplied by the first number of processors to produce a processor bump value. Each processor then is controlled to calculate attribute data for pixels in each respective sub-set of stripes based upon the processor bump value and the received attribute data for the initial pixel.

In preferred embodiments, the scan direction of the display device is horizontal. In preferred embodiments, gradient data based upon the attribute data for the initial pixel is received for the triangle. The gradient data indicates the change in attributes of the pixels from the initial pixel. Accordingly, attribute data of the pixels in each respective sub-set of stripes may be calculated based upon the gradient data. In preferred embodiments, each stripe has a width in the X direction of one pixel.

In some embodiments, a first processor calculates attribute data for the first stripe, and attribute data for a first sub-set of stripes that includes the first stripe. In such case, attribute data for the pixels in the first subset of stripes may be calculated by controlling the first processor to calculate initial pixel attribute data for initial pixels in all of the stripes in the first sub-set of stripes except for the first stripe. Of course, it is not necessary to calculate the attribute data for the initial pixel in the first stripe since that data is already available. The initial pixel values are calculated based upon the processor bump value and the received attribute data for the first pixel. The first processor then calculates each of the other pixel values in each stripe based upon the initial pixel attribute data of the initial pixel in each respective stripe. In some embodiments, a second processor calculates attribute data for a second subset of stripes. In such case, the second processor may calculate initial pixel attribute data for initial pixels in all of the stripes in the second subset of stripes. The attribute data for the initial pixels are calculated based upon the processor bump value and the received attribute data for the initial pixel. Attribute data for the initial pixels also may be based upon gradient data.

In accordance with yet other aspects of the invention, a cursor may be drawn on a display device (having a plurality of addressable locations) so that it does not entirely obscure images that it is covering. More particularly, a look-up table having cursor data for displaying the cursor on the display device is stored in a memory device. Upon receipt of an input signal identifying an addressable location on the display device, the look-up table is accessed to ascertain the cursor data. The cursor data preferably is accessed based upon the addressable location received in the input signal. A transparency value is then applied to the retrieved cursor data to produce less opaque cursor data. The cursor then is drawn on the display device based upon the less opaque cursor data.

In preferred embodiments, when using an OPENGLTM graphics library, the transparency value is an alpha value of less than one. The addressable location received in the input signal also may be an X-Y value of a point on the display device. In some embodiments, the memory is located on a graphics accelerator that is coupled to the computer system. In such case, the graphics accelerator accesses the look-up table and draws the cursor on the display device.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
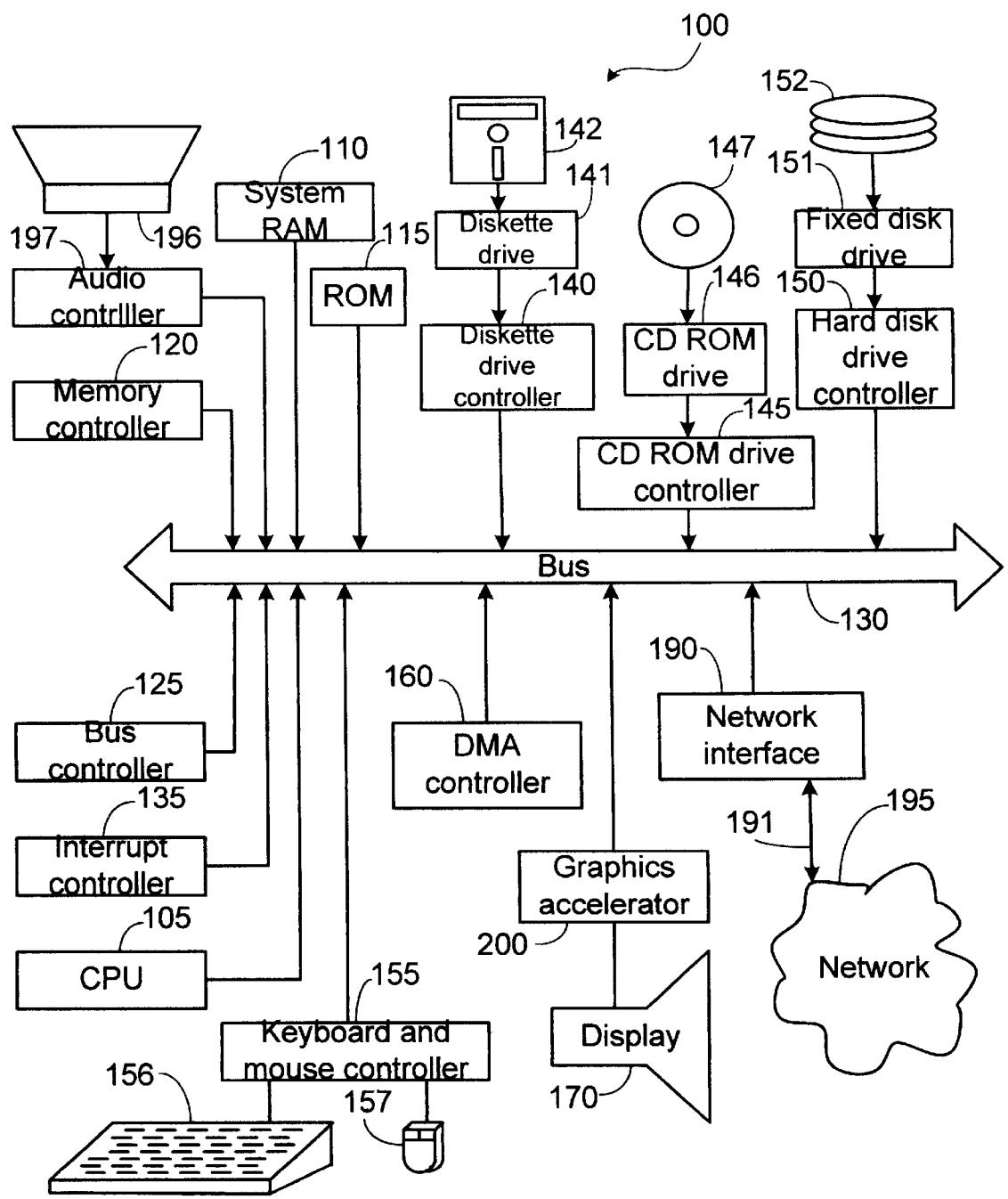
FIG. 1 schematically shows the system architecture of an exemplary computer system on which preferred embodiments of the invention may be implemented.

FIG. 1 illustrates the system architecture for an exemplary computer system 100, such as an Intergraph EXTREME-Z™ graphics workstation (distributed by Intergraph Corporation of Huntsville, Ala.), on which the disclosed method and apparatus for efficiently processing graphical images may be implemented. The exemplary computer system of FIG. 1 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 1.

The computer 100 includes a central processing unit (CPU) 105 having a conventional microprocessor, random access memory (RAM) 110 for temporary storage of information, and read only memory (ROM) 115 for permanent storage of read only information. A memory controller 100 is provided for controlling system RAM 110. A bus controller 125 is provided for controlling a bus 130, and an interrupt controller 135 is provided for receiving and processing various interrupt signals from the other system components.

Mass storage may be provided by known non-volatile storage media, such as a diskette 142, a digital versatile disk (not shown), a CD-ROM 147, or a hard disk 152. Data and software may be exchanged with the computer system 100 via removable media, such as the diskette 142 and the CD-ROM 147. The diskette 142 is insertable into a diskette drive 141, which utilizes a diskette drive controller 140 to interface with the bus 130. Similarly, the CD-ROM 147 is insertable into a CD-ROM drive 146, which utilizes a CD-ROM drive controller 145 to interface with the bus 130. Finally, the hard disk 152 is part of a fixed disk drive 151, which utilizes a hard drive controller 150 to interface with the bus 130.

User input to the computer 100 may be provided by a number of devices. For example, a keyboard 156 and a mouse 157 may be connected to the bus 130 by a keyboard and mouse controller 155. An audio transducer 196, which may act as both a microphone and a speaker, is connected to the bus 130 by audio controller 197. It should be obvious to those reasonably skilled in the art that other input devices, such as a pen and/or tablet and a microphone for voice input, may be connected to computer 100 through bus 130 and an appropriate controller. A direct memory access (DMA) controller 160 is provided for performing direct memory access to system RAM 110. A visual display may be generated by a graphics accelerator 200 (discussed in detail below) that controls a display device 170. The display device 170 preferably is a conventional horizontal scan cathode ray tube ("CRT") monitor having a plurality of pixels. The pixels are arranged in a two-dimensional X-Y grid and are selectively lit, as directed by the graphics accelerator 200, for displaying an image. The display device 170 may be, for example, an IBM G72 General Series Monitor, distributed by International Business Machines Corporation of Armonk, N.Y.

A network adapter 190 also may be included that enables the computer system 100 to connect to a network 195 via a network bus 191. The network 195, which may be a local area network (LAN), a wide area network (WAN), or the Internet, may utilize general purpose communication lines that interconnect a plurality of network devices.

The computer system 100 preferably is controlled and coordinated by operating system software, such as the WINDOWS NT@ operating system (available from Microsoft Corp., of Redmond, Wash.). Among other computer system control functions, the operating system controls allocation of system resources and performs tasks such as process scheduling, memory management, networking, and I/O services.

Figure 2A:
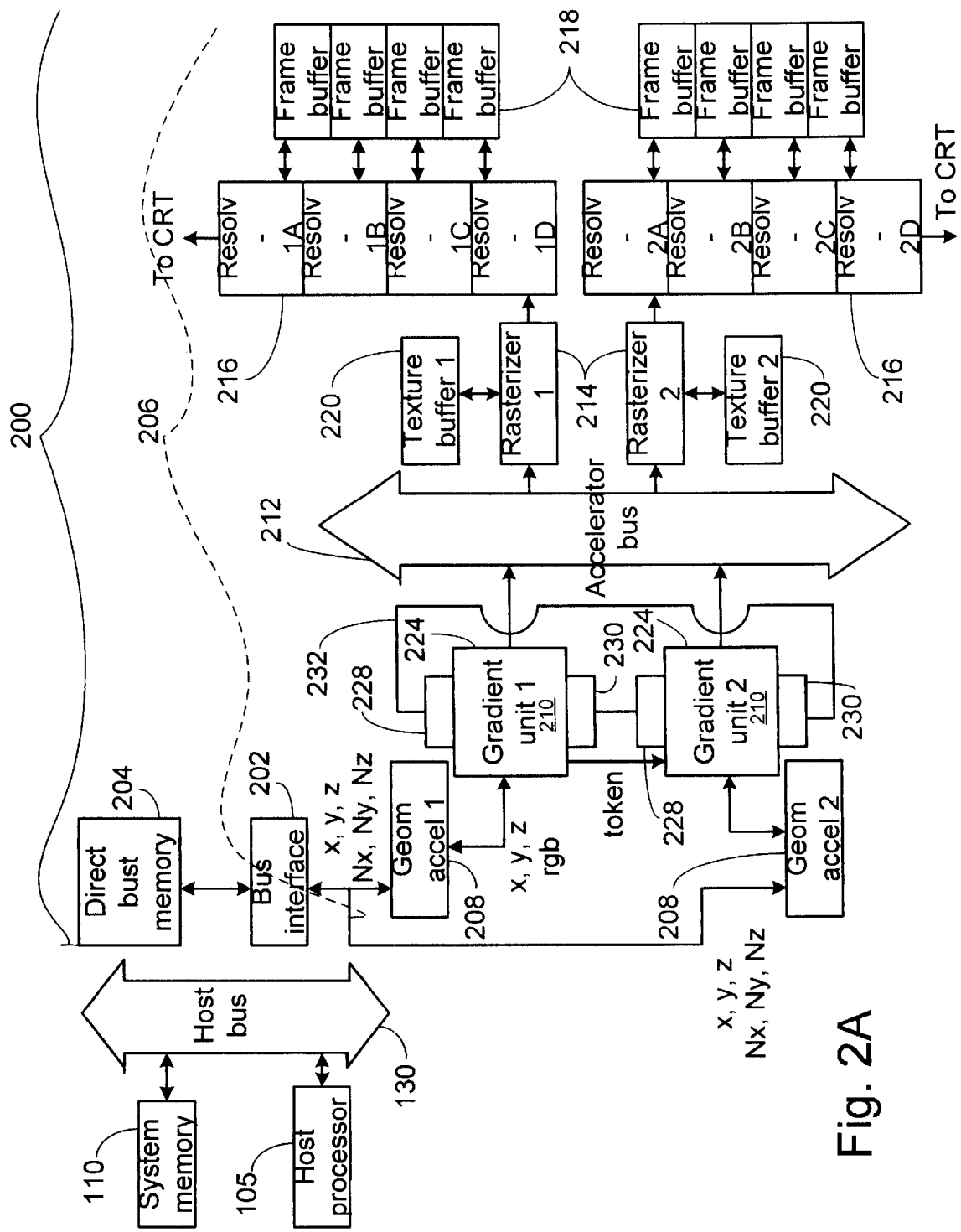
FIG. 2A schematically shows a graphics accelerator having a plurality of parallel graphical data processing units configured in accordance with preferred embodiments of the invention.
Figure 2B:
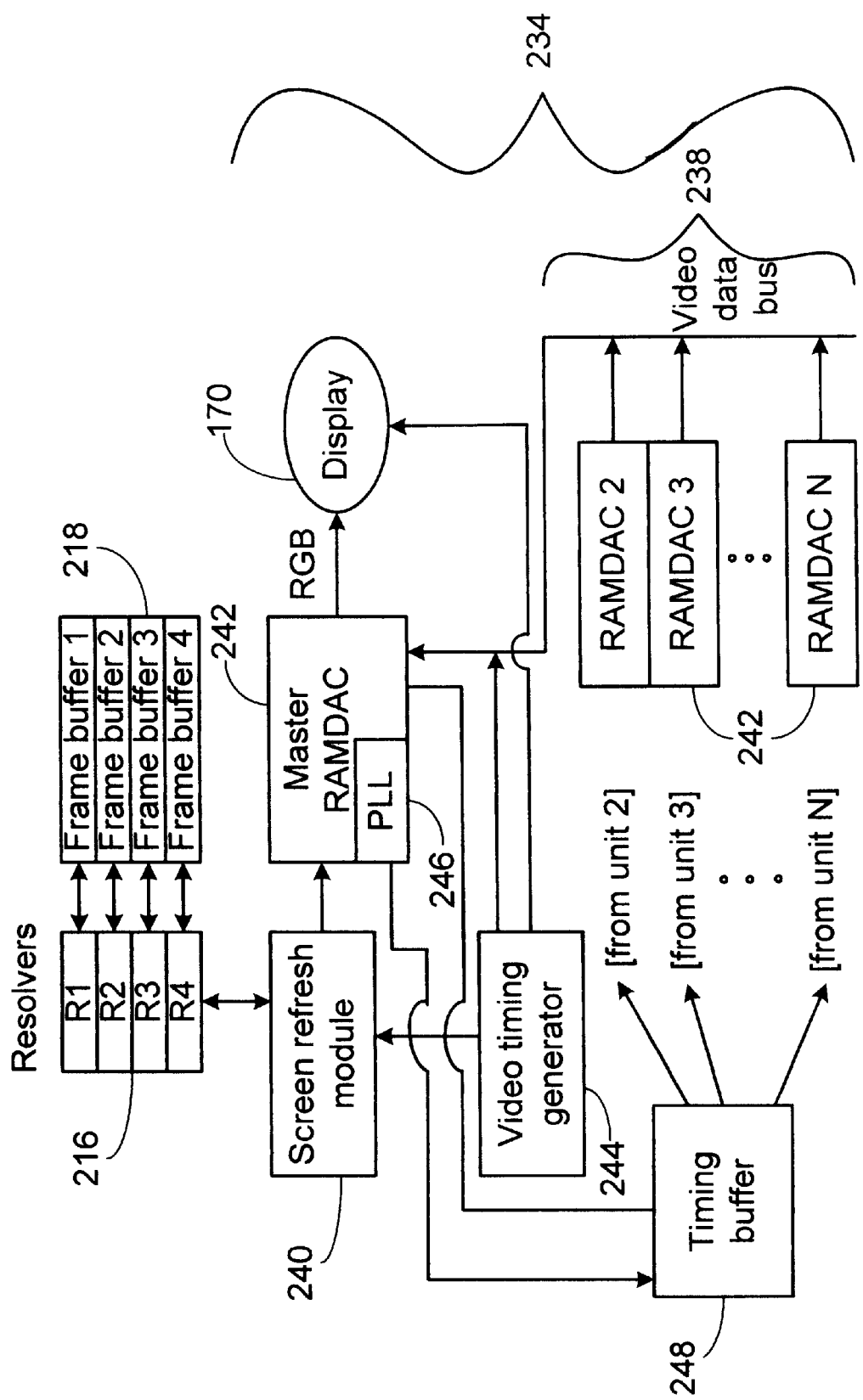
FIG. 2B schematically shows a preferred embodiment of a back end module for retrieving graphical data from a frame buffer and displaying such graphical data on a display device.

FIGS. 2A and 2B schematically show the graphics accelerator 200 configured in accordance with preferred embodiments of the invention. The exemplary graphics accelerator 200 in FIGS. 2A and 2B has two geometry accelerators (described below) and two post geometry accelerator processors (i.e., two rasterizer/gradient unit pairs, discussed below, referred to herein as attribute processors 314). Of course, because two of each type of processor are discussed for simplicity, it should be apparent to those skilled in the art that additional or fewer processors may be utilized.

As discussed in greater detail below, the graphics accelerator 200 preferably includes a plurality of parallel processing units that divide the graphics processing in an efficient manner among processors. Accordingly, graphics request streams may be more rapidly processed for display by the display device 170.

The graphics accelerator 200 preferably includes a bus interface 202 for interfacing with the system bus 130, memory 204 (e.g., DIRECT BURST T&r memory) for temporarily storing graphics request streams received from the host processor 105, and the plurality of processing units for processing the graphics request stream. In preferred embodiments, the memory 204 is in the form of "write combining memory", commonly defined and utilized by Intel microprocessors (e.g., PENTIUM II Tb* central processing units), available from Intel Corporation of Santa Clara, Calif. Such memory 204 preferably is configured to receive graphics request stream data in bursts directly from the CPU. See, for example, copending U.S. patent application Ser. No. 09/345,678 entitled "Method and Apparatus for Transporting Information to a Graphic Accelerator Card," filed on Jun. 30, 1999, for more details on the use of memory 204, the disclosure of which is incorporated herein, in its entirety, by reference.

The plurality of processing units preferably processes three dimensional ("3,") graphical images as a plurality of individual triangles defined in 3D space. As known in the art, this method of processing 3D graphical images is known as "tessellation." The plurality of processing units receives incoming triangle vertex data and, based upon such vertex data, ultimately draws each triangle on the display device. The incoming vertex data for a given vertex preferably includes the X, Y, and Z coordinate data for the given vertex (identifying the location of the vertex in 3D space), and three directional vector components ("normal vectors") that are perpendicular to the surface of the triangle at that given vertex.

Accordingly, the plurality of processors preferably include a plurality of parallel geometry accelerators 208 that each receive the incoming triangle vertex data from the bus interface 202 and, based upon such incoming data, calculate attribute data (e.g., color data, depth data, transparency data, intensity data, coordinates of the vertices on the display device, etc . . .) for each of the vertices in the triangle. In preferred embodiments, the state of each geometry accelerator 208 is preconfigured with previously received state data received from the host. When in a given state, a given geometry accelerator processes the incoming data to produce the vertex attributes in accord with the preconfigured state. For example, mathematical models of various images (e.g., a golf ball) and light sources may be stored within memory of the geometry accelerators 208. Such models may be retrieved and utilized to produce the vertex attribute data upon receipt of state data setting the state of the geometry accelerators 208. The state of a given geometry accelerator 208 may be changed upon receipt of new state data that correspondingly changes the state of the given geometry accelerator 208.

Once calculated by the geometry accelerators 208, the vertex attribute data is transmitted to the attribute processors 314 (discussed above). More particularly, the vertex attribute data is forwarded to a plurality of parallel gradient producing units 210 that each calculate gradient data for one of the triangles. In general terms, gradient data indicates the rate of change of attributes for each pixel in a triangle as a function of the location of each pixel in the triangle. In preferred embodiments, the gradient data is in the form of mathematical derivatives. The gradient data and attribute data then are broadcasted, via an accelerator bus 212, to a plurality of parallel rasterizers 214. Each rasterizer 214 calculates pixel attribute data for select pixels within a triangle based upon the vertex attribute data and the gradient data. A plurality of resolvers 216 then stores the resultant attribute data for each pixel in one of a plurality of frame buffers 218. A texture buffer 220 also may be included for performing texture operations.

Figure 2C:
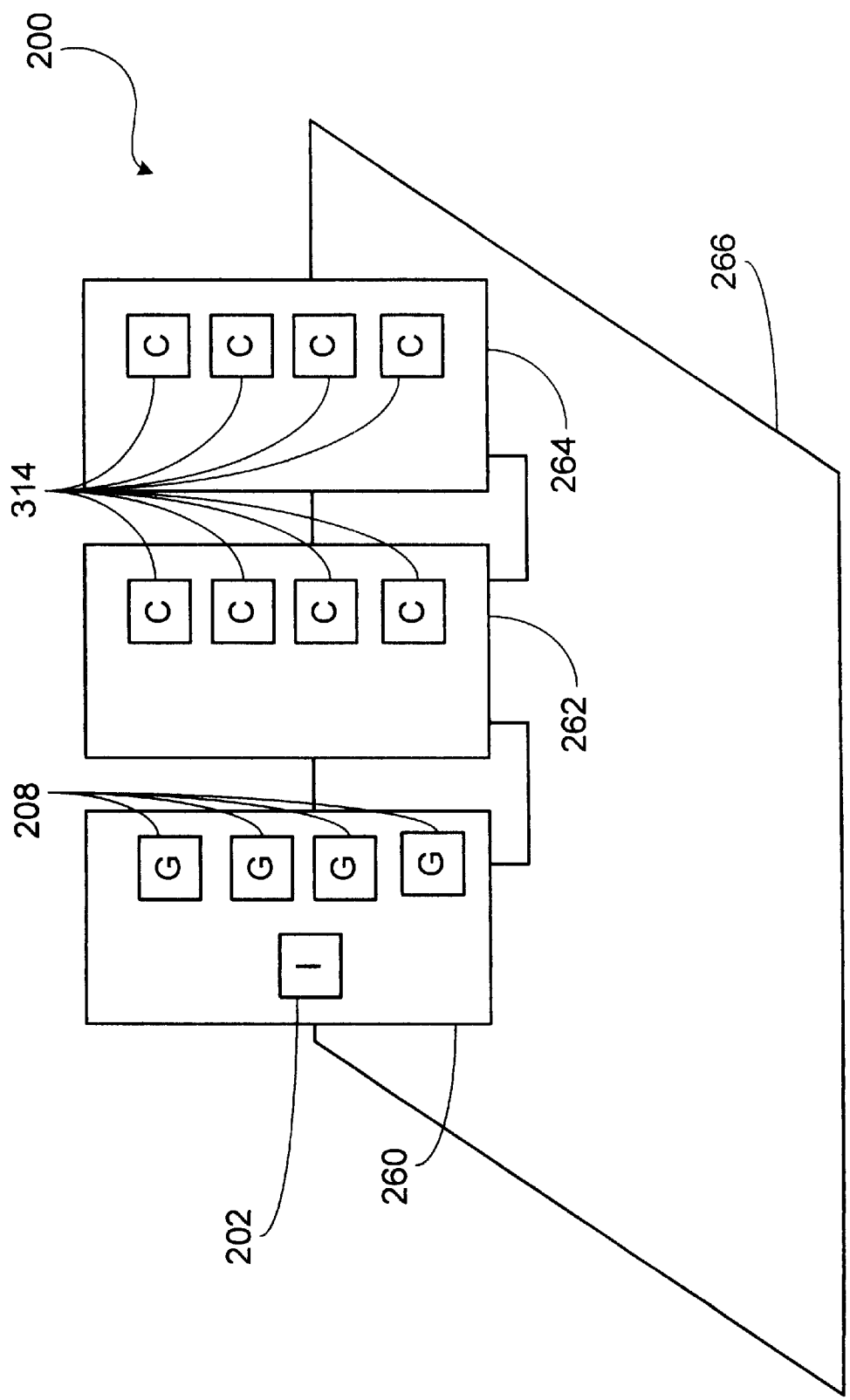
FIG. 2C schematically shows a graphics accelerator card having multiple graphics processors for processing a graphical image in accord with preferred embodiments of the invention.
Figure 3:
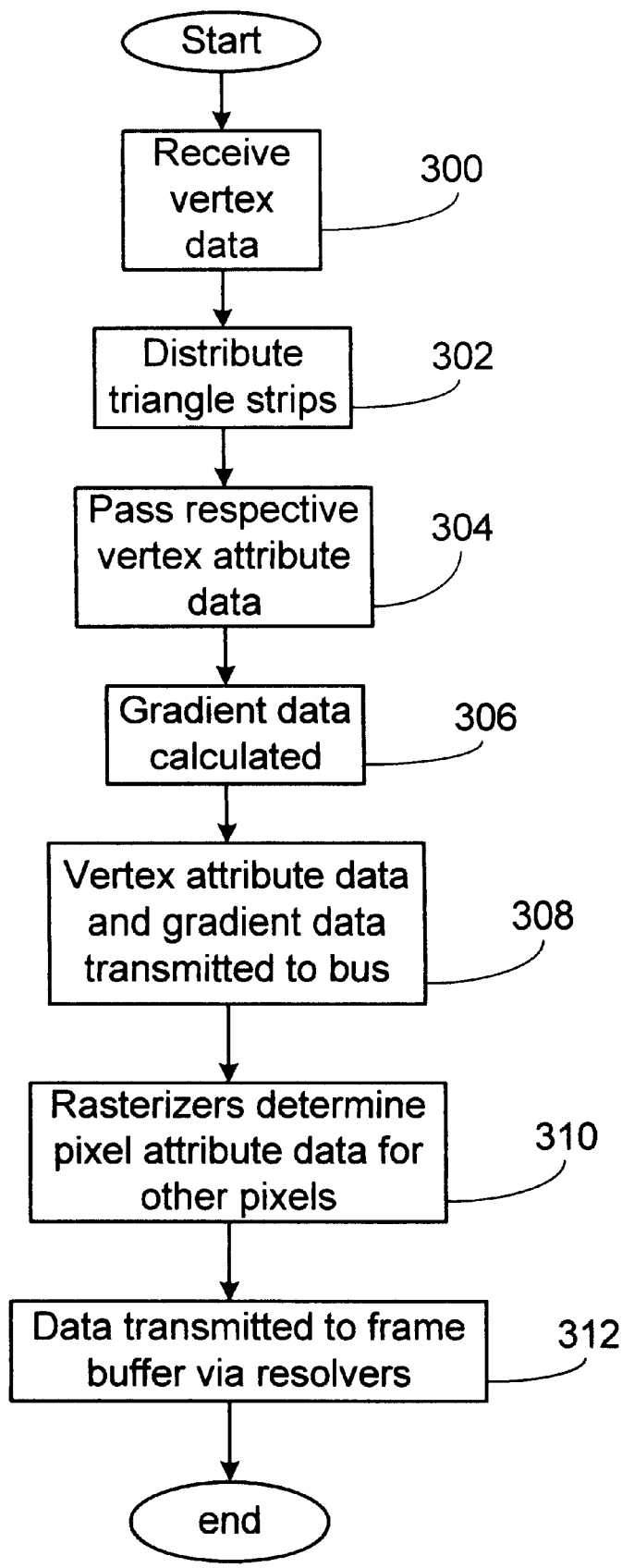
FIG. 3 generally shows a preferred method of processing graphical attribute data with the graphics accelerator shown in FIG. 2A.

As suggested above, preferred embodiments of the invention include eight each of the geometry accelemtors 208, gradient producing units 210, rasterizers 214, and frame buffers 218. Each of these elements preferably is coupled to a circuit board to form a single graphics card. FIG. 2C shows an exemplary graphics accelerator card having one interface 202, four geometry accelerators 208, and eight attribute processors 314. In preferred embodiments, the interface 202 and four geometry accelerators 208 are coupled to a first card 260, four attribute processors 314 are coupled to a second card 262, and four additional attribute processors 314 are coupled to a third card 264. Each of the first, second, and third cards 260, 262, and 264 plug into slots on a parent motherboard card 266 to form the graphics accelerator 200.

Alternative embodiments utilize different numbers of each of the elements. Among other methods, the various elements communicate via a peer-to-peer token passing configuration, the accelerator bus 212, and a video data bus (discussed below). Each of these communication methods are discussed in greater detail below.

Each frame buffer 218 preferably is a double-buffered, thirty-two megabyte frame buffer 218 having a back buffer and a front buffer. Accordingly, the contents of the front buffer is displayed by the display device while the resolver 216 is writing to the back buffer. Conventional buffer swaps enable the contents of the back buffer to be displayed.

Figure 4A:
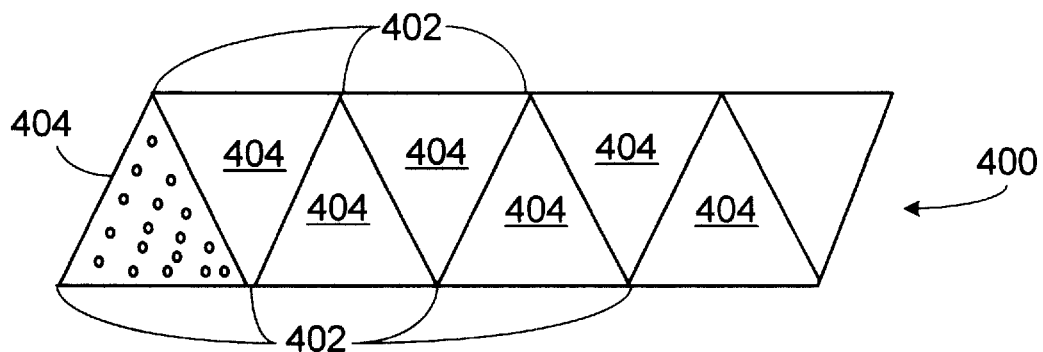
FIGS. 4A and 4B schematically show triangle strips of varying size.
Figure 4B:
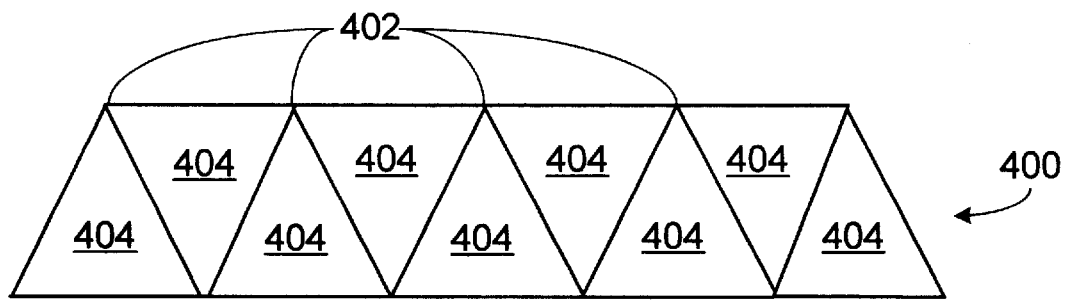

The operation and cooperation of each of the elements of the graphics accelerator 200 are discussed below with reference to FIGS. 3–14. Primarily, FIG. 3 generally shows a preferred process for processing a sequential stream of graphics requests by the parallel processors. The process begins at step 300 in which vertex data is received by the bus interface 202. The data may be temporarily stored in queues in the memory 204 until distributed to the geometry accelerators 208. The data preferably is received and processed as a sequential series of ordered triangle strips 400. As shown in FIGS. 4A and 4B, a triangle strip 400 includes a plurality of vertices 402 that together form a contiguous strip 400 of triangles 404. The triangle strip 400 shown in FIG. 4A, for example, includes ten vertices 402 that form eight separate, contiguous triangles 404. In a similar manner, FIG. 4B shows an exemplary triangle strip 400 having eleven vertices 402 that form nine triangles 404.

The process continues to step 302 in which the triangle strips 400 are distributed to the various geometry accelerators 208 in the received sequential order. In preferred embodiments, each geometry accelerator 208 is configured to process triangle strips 400 having eight vertices 402. The eight vertices include two vertices processed by the geometry accelerator 208 that processed the immediately preceding triangle strip, and six additional successive vertices after the two re-processed vertices. For example, for a graphics request stream having twenty-six vertices (i.e., four triangle strips with eight vertices each) that are processed by first and second geometry accelerators 208, a first strip 400 having vertices 1–8 is processed by the first geometry accelerator, a second strip 400 having vertices 7–14 is processed by the second geometry accelerator, a third strip 400 having vertices 13–20 is processed by the first geometry accelerator, and a fourth strip 400 having vertices 19–26 is processed by the second accelerator. Accordingly, the geometry accelerators 208 preferably process incoming triangle strips 400 in a round robin manner via a token passing method (discussed below).

In alternative embodiments, triangle strips 400 of other lengths may be processed by the geometry accelerators 208. In yet other embodiments, triangle strips 400 of varying lengths may be processed by each geometry accelerator. Regardless of the size of the triangle strips 400, however, each successive triangle strip 400 preferably is assigned sequentially to successive geometry accelerators 208 in a round robin manner as described in the immediately preceding example. See, for example, U.S. patent application Ser. No. 09/353,420 entitled, "Wide Instruction Word Graphics Processor" (naming Vernon Brethour, Gary Shelton, William,Lazenby, and Dale Kirkland as inventors, filed on even date herewith, the disclosure of which is incorporated herein, in its entirety, by reference) for additional information relating to the operation and configuration of the geometry accelerators 208.

After the triangle strips 400 are distributed to the geometry accelerators 208 (step 302), the process continues to step 304 in which geometry accelerators 208 process their respective triangle strips 400 and transmit output vertex attribute data to their respective gradient producing units 210. As shown in FIG. 2A, each geometry accelerator 208 transmits its output data to a single gradient producing unit. Upon receipt by a given gradient producing unit, the vertex attribute data is utilized to calculate gradient data for each pixel within a given triangle in the triangle strip 400 (step 306). Each of the pixels within the given triangle (referred to herein as "intermediate pixels") are defined by the three vertices of the given triangle. For example, FIG. 4A shows a given triangle having vertices and additional pixels within the given triangle. The gradient data may be produced in a manner similar to that utilized by the Intergraph PANTHER™ rasterizer and gradient producing unit, available from Intergraph Corporation of Huntsville, Ala. As discussed in detail below (step 310, discussed below) and noted above, the gradient data and vertex attribute data are utilized by each of the rasterizers 214 to calculate the attribute data for each intermediate pixel in the given triangle. Among many methods, the gradient data may be used to roughly interpolate from the vertex attribute data, based upon pixel location, to calculate the pixel attribute data.

The process then continues to step 308 in which the vertex attribute data and gradient data are broadcasted to the accelerator bus 212. The plurality of parallel rasterizers 214 each receive the vertex attribute data and gradient data and collectively calculate intermediate pixel attribute data in accord with preferred embodiments of the invention (step 310). More particularly, each rasterizer 214 is configured to process pixels in one set of pre-assigned vertical stripes 500 (see, for example, FIG. 5) in each triangle. A vertical stripe 500 includes a plurality of contiguous pixels that extend in a direction that is transverse to the scan direction of the display device. For example, in a horizontal scan display device, each stripe would be a vertical column of single pixels. The stripes 500 in a pre-assigned set preferably are non-contiguous vertical stripes 500. In systems with two rasterizers 214, each rasterizer 214 may process every other stripe 500. In systems with three rasterizers 214, each rasterizer 214 may process every third stripe 500. In systems with eight rasterizers 214, each rasterizer 214 may process every eighth stripe 500.

Figure 5:
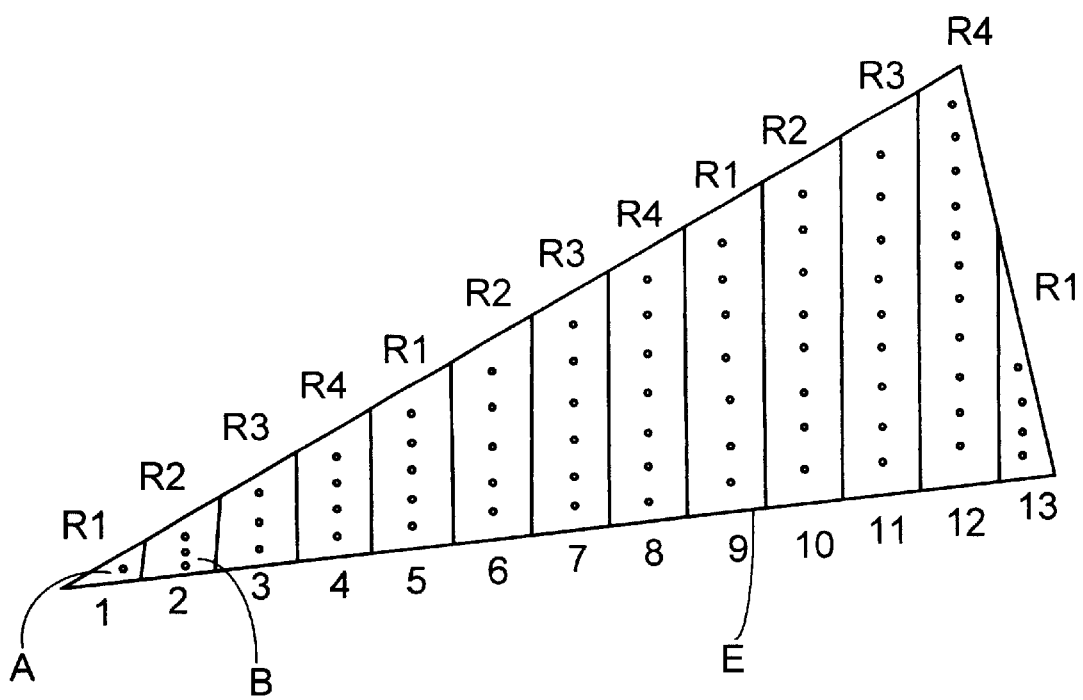
FIG. 5 schematically shows an exemplary triangle that is divided into a plurality of stripes, where each stripe is processed by a different rasterizer.
Figure 5:

By way of example, FIG. 5 schematically shows an exemplary triangle that has thirteen stripes 500 and is processed by a graphics accelerator 200 having four rasterizers 214. The rasterizers 214 are identified in the figure as first through fourth rasterizers R1–R4. Each rasterizer 214 is assigned every fourth vertical stripe 500. In preferred embodiments, the vertical stripes 500 are formed to extend vertically from the longest of the three edges of the triangle (referred to herein as the "longest edge"). Each stripe 500 has a width in the X direction (i.e., in the scan direction) of one pixel to form a column of pixels. Each stripe 500 extends vertically (i.e., in the Y direction) from the longest edge of the triangle to the most distant pixel (from the longest edge) in the column within the triangle. As shown in FIG. 5, the first rasterizer 214 processes stripes 1, 5, 9, and 13, the second rasterizer 214 processes stripes 2, 6, and 10, the third rasterizer 214 processes stripes 3, 7, and 11, and the fourth rasterizer 214 processes stripes 4, 8, and 12. In preferred embodiments, no two rasterizers 214 process the same stripe of pixels, and each stripe in a given set of stripes for a given rasterizer 214 is noncontiguous with the other stripes in the given set.

The process then continues to step 312 in which each rasterizer 214 transmits the intermediate pixel attribute data and vertex attribute data to one resolver 216 for storage in one of the frame buffers 218. In preferred embodiments, each resolver 216 includes four subresolvers for storing the data. Four subresolvers are utilized since in many resolver and rasterizer architectures, rasterizers 214 can produce output data at a rate of about four times greater than the rate that a single resolver 216 can store the data in the frame buffer 218. Accordingly, utilizing four subresolvers enables data to be processed by the rasterizers 214 and stored in the frame buffer 218 by the subresolvers with a minimum of delay.

Figure 6:
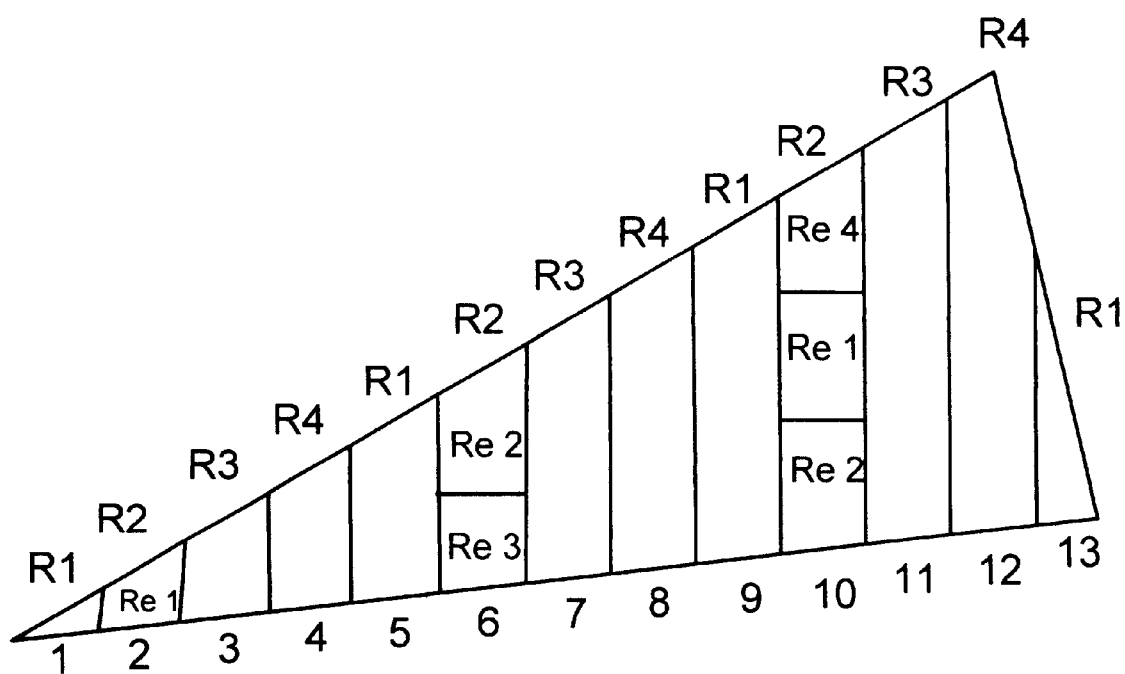
FIG. 6 schematically shows another exemplary triangle divided into stripes in which each stripe is processed by one or more resolvers.

In accordance with preferred embodiments of the invention, each rasterizer 214 includes four subresolvers that are configured to store preselected portions of a stripe 500 to an assigned frame buffer 218. The preselected portions of the stripes 500 preferably are varied to distribute the processing among the various subresolvers. FIG. 6 shows a preferred distribution pattern of pixels for first through fourth subresolvers (Re1–Re4) for the second rasterizer 214 (R2, FIG. 5) on an exemplary triangle with thirteen stripes 500. Other than the second stripe 500 (which has very few pixels), the other stripes 500 (six and ten) utilize more than one resolver 216. The other rasterizer/subresolver combinations operate in a similar manner. In preferred embodiments, each subresolver is assigned eight vertical pixels (not shown in FIG. 6) in a column. Various other combinations of subresolvers may be utilized, however, in accord with preferred embodiments of the invention. Moreover, additional or fewer subresolvers may be utilized in accord preferred embodiments of the invention.

As shown in FIGS. 2A and 2B, each frame buffer 218 is logically divided into a plurality of sections. In preferred embodiments, the frame buffers 218 are divided so that each subresolver utilizes one section of a frame buffer 218. Accordingly, for the exemplary system having four subresolvers, each frame buffer 218 is divided into four sections. Each subresolver therefore writes pixel attribute data to its assigned frame buffer section.

As known in the art, tessellation processes also utilize non-triangle polygons to process 3D images. Accordingly, the process shown in FIG. 3 may be applied to graphics accelerators that process graphical data as non-triangle polygons. Systems that process graphical data as squares or pentagons therefore may utilize the principles of the invention.

As noted above, various elements of the graphics card communicate via a self-regulating, peer-to-peer arrangement in which no external processor, application specific integrated circuit, or other external device controls processor interaction. More particularly, in preferred embodiments of the invention, each of the gradient producing units 210 controls the accelerator bus 212 on a cyclical, round robin basis. No more than one gradient producing unit 2IO can control the bus 212 at a single time. See, for example, commonly owned U.S. Pat. No. 5,917,502 (entitled "Peer-to-peer Parallel Processing Graphics Accelerator"), the disclosure of which is incorporated herein, in its entirety, by reference, for additional details relating to this processing method. Each gradient producing unit 210 thus includes an input 224 that is coupled with one of the geometry accelerators 208 to receive vertex attribute data, an output 226 coupled to the accelerator bus 212 for broadcasting gradient data to the accelerator bus 212, a token input 228 for receiving control tokens, (FIG. 2A), a token output 230 for forwarding control tokens (FIG. 2A), and a token bus 232 (FIG. 2A) coupled between peer gradient producing units 210. To control the round-robin execution by each of the gradient units 210, there preferably is a finite state machine timing loop cooperatively controlled by all gradient units 210, where the state machine has one node for each of the gradient units 210. The token input 228 for each unit 210 is used to implement each node of the state machine. The current state of the finite state machine is determined by whichever unit 210 has a token input 228 that contains a state indicator, which is referenced in the description and the claims that follow as a "token." The presence of the token within the token input 228 of one of the units therefore indicates that such unit 210 currently controls the accelerator bus 212. Accordingly, only the gradient unit 210 having the token can transmit data to the accelerator bus 212. State changes are effected by the gradient unit's round-robin method of passing of the token the next unit's token input 228.

In preferred embodiments, attribute data associated with each triangle strip 400 includes a flag that, when set and read by a gradient unit 210, causes such unit 210 to pass the control token to the next peer gradient unit 210 in the chain. The token does not pass if the flag is not set. This ensures that triangle strips 400 are processed in the proper sequential order that is required for the image to be properly displayed.

By way of example, a graphics processing card with two gradient producing units 210 may be utilized for processing the above noted exemplary four triangle strip graphics request stream. When used as such, the first unit 210 controls the bus 212 first when data for vertices 1–8 are broadcasted, the second unit 210 controls the bus 212 when data for vertices 7–24 are broadcasted, the first unit 210 resumes control of the bus 212 to broadcast data for vertices 13–20, and the second unit 210 again resumes control of the bus 212 to broadcast data for vertices 19–26. In preferred embodiments, the redundant vertex information (i.e., vertices 7–8, 13–14, and 19–20) is ignored. The token input 228 of the first unit 210 has the token when it controls the bus 212. When bus control is to be passed, the token is transmitted to the second unit token input 228, via the first unit token output 230 and token bus 232 between the processors. When bus control is to be passed again, the token is transmitted to the first unit token input 228, via the second unit token output 230 and token bus 232 between the processors. No two units simultaneously control the bus 212. Accordingly, since only one unit 210 may broadcast to that bus 212 at a single moment and each unit 210 cyclically controls the bus 212 in a predetermined order, the order of the graphics request stream is properly maintained.

There are times that data for a triangle strip 400 is broken up into a plurality of sub-triangle strips 400 while being processed by a geometry accelerator. For example, as six vertex triangle strip 400 may be processed to produce two or more separate data streams of sub-triangle strips. A first data stream may include data for vertices 1–4, while a second data stream may include data for vertices 3–6. Both data streams, however, are processed by the same geometry accelerator. In such case, the flag is included but not set at the end of the first data stream. After processing gradient data for the first data stream, a gradient producing unit 210 detects that the flag is not set and responsively maintains control of the accelerator bus 212. Upon receipt of the second data stream, such gradient producing unit 210 locates the flag and determines that it is set. Consequently, the gradient producing unit 210 passes the token to the next peer unit, thereby permitting the next ordered set of vertices (i.e., the next triangle strip) to be processed.

In preferred embodiments of the invention, the data associated with the triangle strips 400 is transmitted to the gradient units 210 as a sequence of data records associated with successive vertices. The sequence of records are preceded by a header indicating both the type of data following the header, and the identity of a terminator record indicating the end of the data triangle strip 400. The type of data indicates the fomrat of each record (i.e., the location and identity of each attribute in the records). More particularly, among other things, color data, transparency data, coordinate data, fog data, and other attribute data are positioned at preselected locations within each record. The header therefore enables the gradient units 210 to accurately locate, extract, and interpret necessary data in each record that is required to produce the gradients.

Preferred embodiments include an arrangement for placing the sequence of records in the data stream, as well as an arrangement for placing the data terminator data record at the end of the data stream for each triangle strip 400. Receipt of the terminator data record by a gradient unit identifies the end of the sequence of records. In preferred embodiments, each record includes at least one floating point value that specifies at least a first datum associated with a single vertex (i.e., each record includes data for one vertex). The terminator data record preferably includes a floating point value in which the first datum is set to a value corresponding to the known value, "Not a Number." This type of terminator record, which preferably is identified in the header that precedes the sequence of records, is selected to be a number that cannot be produced by the specified processing units utilized to process the records in the sequence. "Not a Number" is one such type that cannot be produced by a specified type of processing unit. The terminator record further includes a single bit representing the above noted flag that, when set to a high value, indicates that the end of the triangle strip 400 has been reached.

When a triangle strip 400 is divided into multiple sub-triangle strips (as noted above), each sub-triangle strip preferably includes a terminator record having Not a Number and the flag bit. Only the final sub-triangle strip, however, is followed by a terminator record in which the flag bit is set. As suggested above, unless the flag bit is set, the gradient producing unit 210 controlling the bus 212 maintains control of the bus 212. For more information about the use of Not a Number as a terminator record, see, for example, commonly owned U.S. Pat. No. 5,801,714, entitled "Vertex List Management System" for more details on the use of Not a Number in this manner, the disclosure of which is incorporated herein, in its entirety, by reference.

Figure 7:
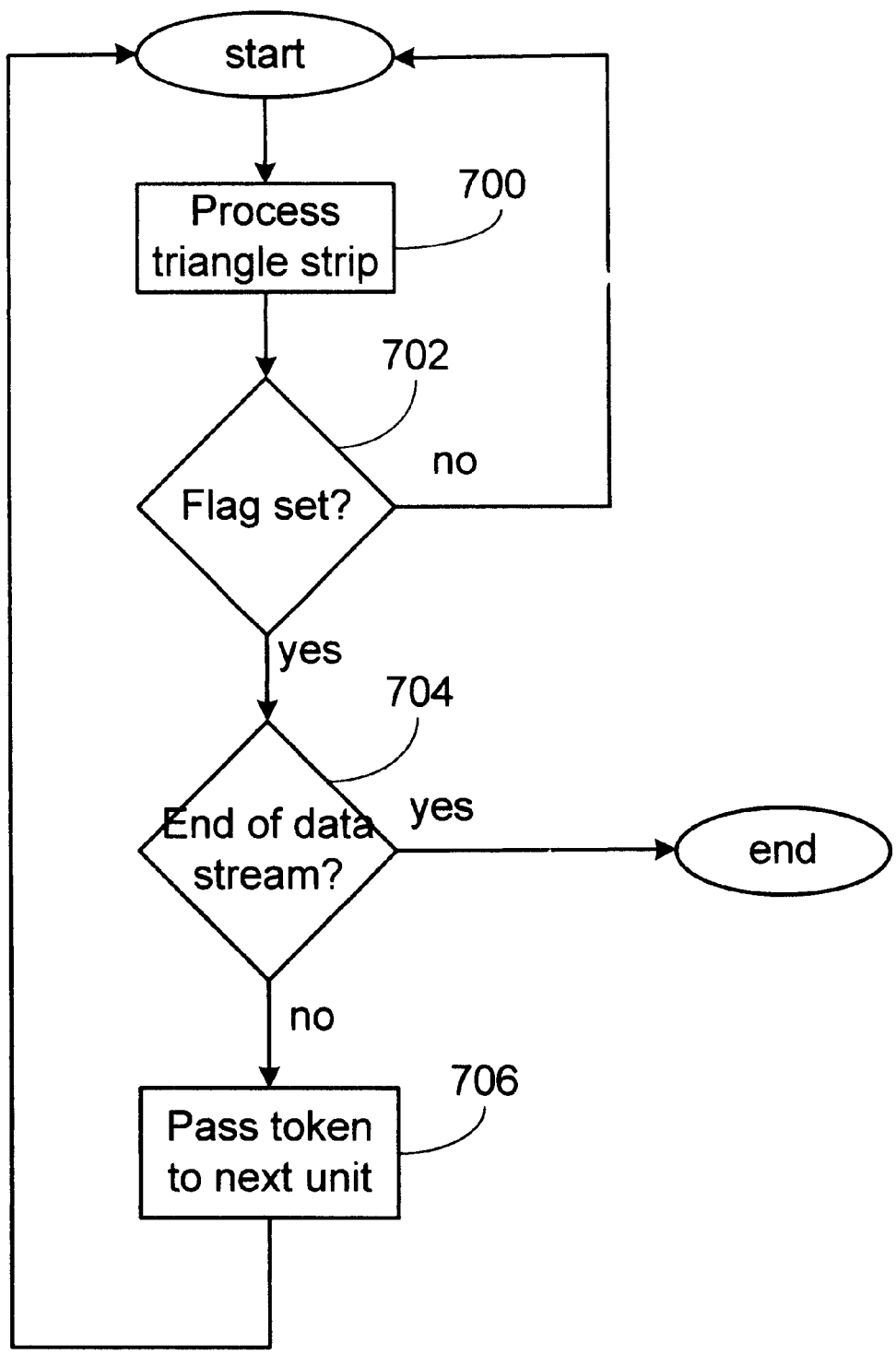
FIG. 7 shows a preferred method of token passing between gradient producing units when processing a sequential graphical request data stream.

FIG. 7 generally shows a preferred method of processing a sequential series of graphical data records utilizing peer-to-peer gradient producing units 210. The series of data records may be a stream of a plurality of triangle strips 400. The process begins at step 700 in which a first triangle strip 400 is processed by a first gradient producing unit. No one specified gradient producing unit 210 necessarily is the first gradient producing unit 210 to begin processing such series of records. Instead, any one of the gradient producing units 210 may be the first unit. It is important, however, to maintain the order that the units control the bus 212 so that successive units process successive records. As discussed above and below, the peer-to-peer arrangement ensures proper record order. The process continues to step 702 in which the first unit 210 detects a termination record and determines if the flag is set in such termination record. As noted above, some strips 400 may be prematurely terminated. In such case, the flag is not set and the first gradient producing unit 210 maintains control of the bus 212. Additional vertices are received and processed until another termination record is received. Again, it is determined if the flag is set.

If it is determined at step 702 that the flag is set, then the process continues to step 704 in which it is determined if the end of the entire graphical request data stream of triangle strips 400 has been reached. If the end of the stream has been reached, then the process ends. In preferred embodiments, the end of the stream is considered to be reached when no more data is received. In alternative embodiments, a flag may be utilized to indicate the same.

Conversely, if it is determined at step 704 that the end of the data stream has not been reached, then the unit 210 controlling the bus 212 transmits the token to the next successive peer gradient producing unit 210 via its token output 230 and token bus 232, thus passing control of the bus 212 to the next gradient producing unit 210 (step 706). Upon receipt of the control token in the next unit's token input 228, such unit 210 takes control of the bus 212. No other unit 210 can control the bus 212 at this time. The process then loops back to step 700 in which the next triangle strip 400 is processed. Such next triangles strip 400 is the next successive triangle strip 400 in the sequential series of graphical data records. The process continues for each successive triangle strip 400 until the end of the graphical data stream is reached.

Like other computer devices, the gradient producing units 210 also may be subject to certain interrupts that can disrupt data processing. More particularly, absent special configuration, interrupts in the preferred graphics accelerator can require that a certain gradient producing unit 210 control the bus 212 out of the prescribed order. Consequently, this can cause the triangle strips 400 to be processed out of the prescribed order, thus corrupting the ultimate image that is to be displayed by the display device. Accordingly, preferred embodiments of the invention include an apparatus for returning control of the bus 212 to a unit 210 that was controlling the bus 212 when an interrupt command was received.

One such interrupt is known in the art as a "pass-through" command. When received by a geometry accelerator, a pass-through command preferably is transmitted directly through such accelerator, its accompanying gradient producing unit, and to the accelerator bus 212. A pass through command typically is a command that does not require processing by either one of the geometry accelerator 208 or the gradient producing unit. For example, a pass-through command may be a two-dimensional drawing operation, such as filling in a region of the display device screen with a specified color.

Figure 8:
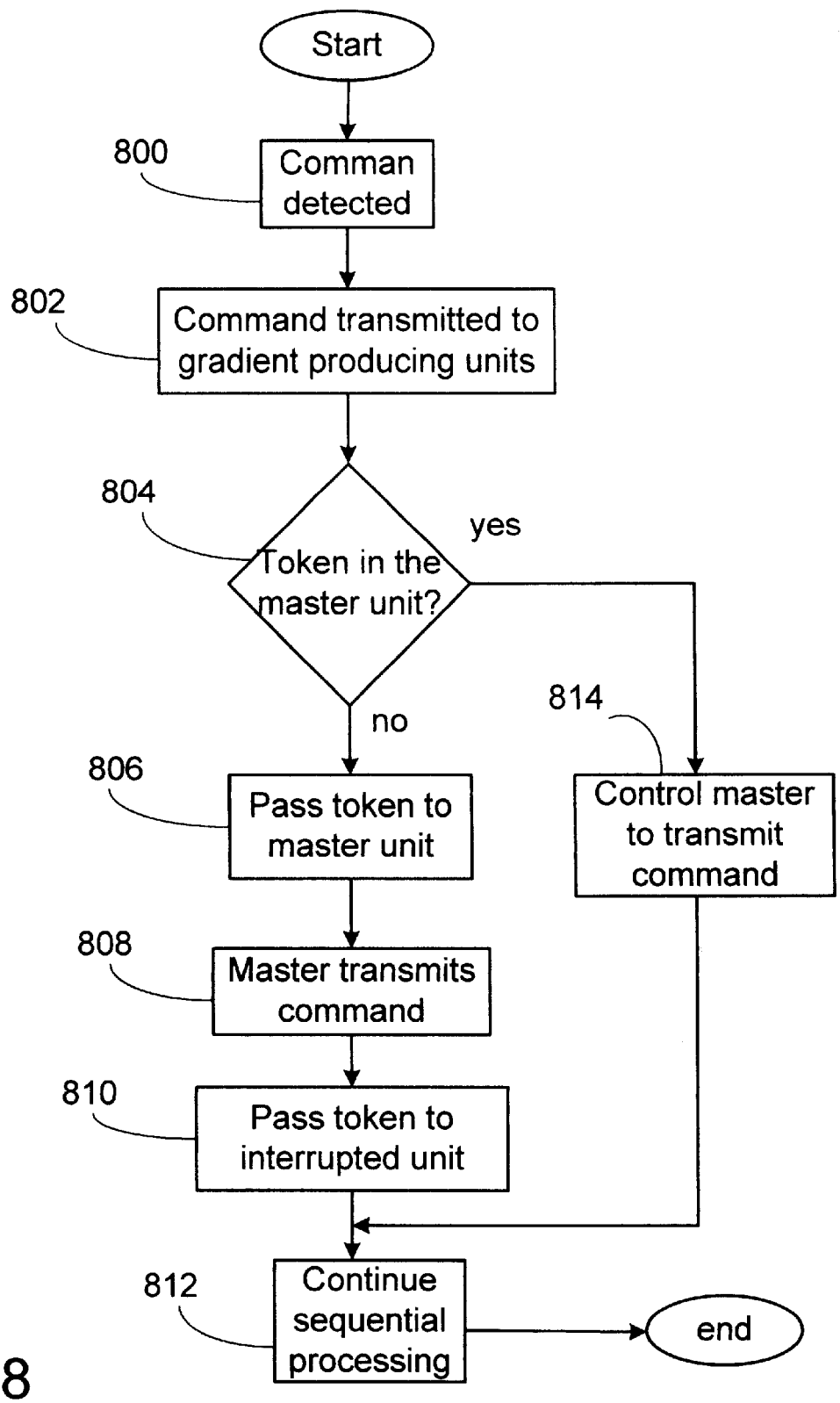
FIG. 8 shows a preferred method of processing pass-through commands while maintaining proper accelerator bus control.

FIG. 8 generally shows a preferred process for transmitting a pass-through command from the geometry accelerators 208 to the accelerator bus 212 when such command is received by a geometry accelerator. The process begins at step 800 in which a pass-through command is detected by each of the geometry accelerators 208. In preferred embodiments, the bus interface 202 broadcasts the pass-through command to each of the geometry accelerators 208. Upon receipt, all of the geometry accelerators 208 transmit the command to their respective gradient producing units 210 without processing such command (step 802). Upon receipt by the gradient producing units 210, it is determined at step 804 if a gradient producing unit 210 designated to be a "master unit" has the control token and thus, controls the accelerator bus 212. In accordance with preferred embodiments, upon receipt of the token, the gradient producing unit 210 designated to be the master unit 210 transmits pass-through commands to the accelerator bus 212. Accordingly, no other peer gradient producing unit 210 transmits pass-through commands.

If it is determined at step 804 that the master unit 210 does not have the control token, then it is determined which unit 210 currently has the token (the "interrupted unit"). Once this is determined, the token is passed from the interrupted gradient unit 210 to the master via all intervening units (step 806). For example, if a third of four gradient units 210 was interrupted, and the first unit 210 is the master unit, then the token first is passed to the fourth unit, and then to the first (master) unit. Upon receipt of the token and consequential control of the bus 212, the master unit 210 transmits the pass through command to the accelerator bus 212. The process then continues to step 810 in which the token is passed back to the interrupted unit 210 via any intervening units. Continuing with the immediately preceding example, the token is passed from the master (first) unit, to the second unit, and then to the third unit. Sequential processing then continues upon receipt of the token by the interrupted unit 210 (step 812).

Returning to step 804, if it is determined that the master unit 210 has the token (i.e., the master unit 210 controls the accelerator bus 212), then the process continues to step 814 in which the master unit 210 is controlled to transmit the pass-through command. The process then continues to step 812 in which sequential processing of the graphics request stream is continued.

Upon receipt of the pass through command, each gradient producing unit 210 is configured to pass the token upon control of the bus 212 (i.e., upon receipt of the token) and not to broadcast any data to the bus 212 at that time. Accordingly, as noted above, when a non-master unit 210 is interrupted by a pass-through command, then such interrupted unit 210 transmits the token to the master unit. Prior to transmitting the token, however, the interrupted unit 210 notes its status as the interrupted unit, and that it passed the token to the master. Each non-master unit 210 that receives the token before the master unit 210 similarly notes that it has already passed the token to the master (via any intervening units) in response to the pass-through command. After the pass through command is transmitted by the master unit, the token is passed back to the interrupted unit. Each subsequent unit 210 that receives the token prior to the interrupted unit 210 checks to determine if it has already passed the token to the master unit. If not, then the token is passed without such unit 210 broadcasting data to the bus 212. When the interrupted unit finally receives the token, it determines that it already has passed the token to the master unit. Once this is determined, normal processing continues. In preferred embodiments, none of the intervening units that received the token, either from the interrupted unit 210 or the master unit, broadcasts data to the bus 212.

Figure 9:
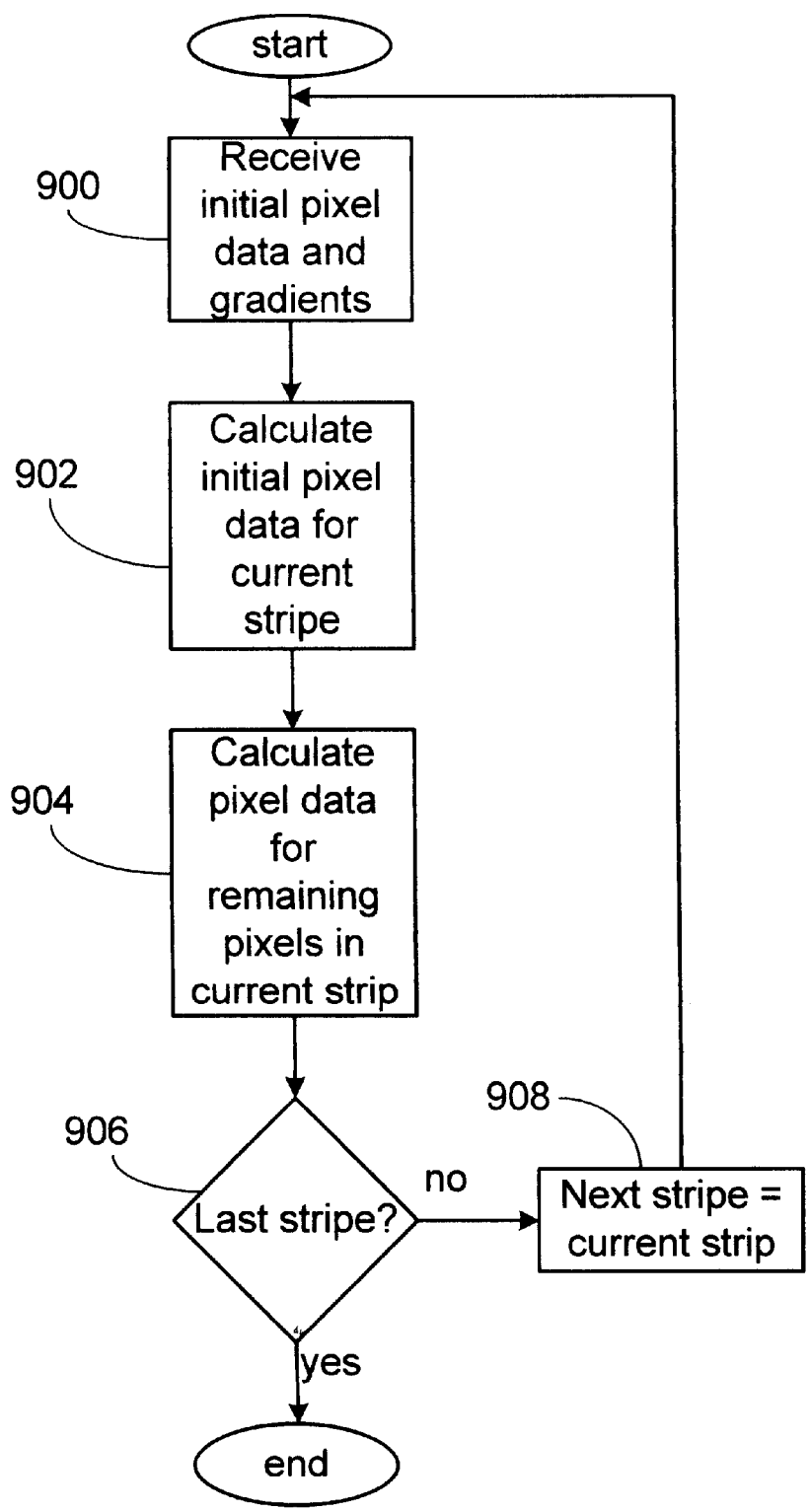
FIG. 9 shows a preferred rasterizing method used by one rasterizer to calculate pixel attribute data for each of its associated stripes.

As noted above, each rasterizer 214 preferably calculates pixel attribute data for a triangle on a per stripe basis. With reference to FIG. 5, in a four rasterizer system, each rasterizer 214 processes pixel data for every fourth stripe 500. FIG. 9 shows a preferred rasterizing method used by one rasterizer 214 to calculate pixel attribute data for each of its associated stripes 500. Each of the plurality of rasterizers 214 in the preferred system executes this preferred rasterizing method for calculating pixel attribute data for their respective associated stripes 500.

The preferred rasterizing method begins at step 900, in which the rasterizer 214 receives both first pixel attribute data for a first pixel in a first stripe 500, and gradient data for the entire triangle. Both the first pixel attribute data and gradient data preferably are calculated by one or more of the gradient units 208. It should be noted, however, that although the first pixel is calculated by one or more of the gradient units 208, it is preferred the rasterizers 214 calculate the attribute values for each of the other pixels in the triangle.

Figure 10:
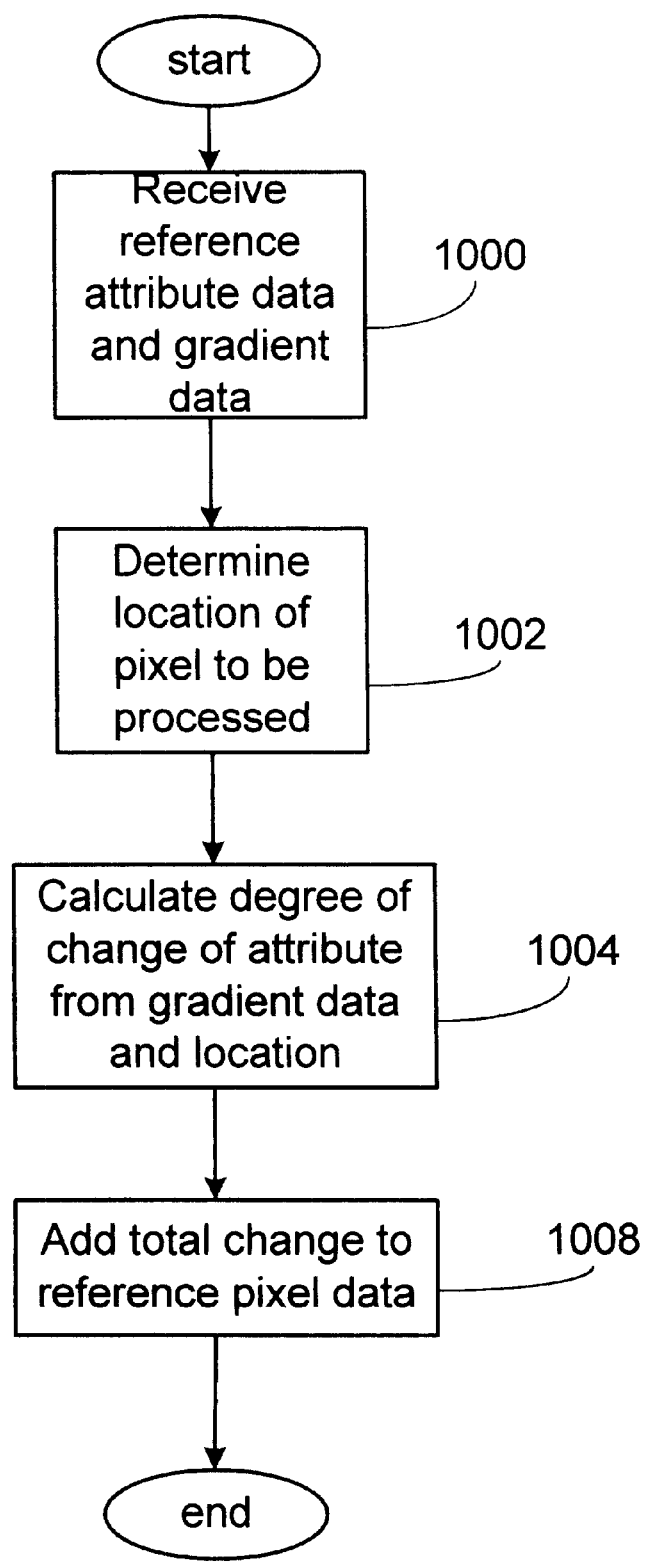
FIG. 10 shows a preferred method of calculating pixel attribute data for a single pixel from a reference pixel.

In preferred embodiments, the first pixel is the pixel nearest to the longest edge of the triangle for the leftmost stripe 500 (see, for example, FIG. 5). In alternative embodiments, the first pixel is any other pixel in the triangle. The gradient data correspondingly includes a plurality of attribute functions that produce attribute data for each pixel. Specifically, the gradient functions preferably represent the rate of change of pixel attributes as a function of (pixel) location within the triangle. As shown in FIG. 10 (discussed below), pixel attribute data for each pixel is calculated by determining the incremental change in a particular attribute from the first pixel. Among other attributes, gradient data may include the rate of change for color change (e.g., green, blue, and red), transparency data, depth data, intensity data, and any other well known type of attribute data utilized in 3D graphics processing. For example, pixel attributes that utilize the well known OPENGL™ graphics library may be calculated and displayed.

Once the first pixel attribute data and gradient data are received by the rasterizer 214, the rasterizer 214 then calculates the initial pixel attribute data for an initial pixel in a current stripe 500 that such rasterizer 214 is processing (step 902). If such current stripe 500 is the stripe 500 that includes the first pixel (i.e., the first stripe 500), then this step may be skipped. If the current stripe 500 is not the first stripe 500, then the rasterizer 214 calculates initial pixel attribute data for an initial pixel in the current stripe 500. In preferred embodiments, the initial pixel is the pixel nearest to the longest edge of the triangle.

After the initial pixel attribute data is calculated, the process continues to step 904 in which the rasterizer 214 calculates pixel attribute data for each of the remaining pixels in the current stripe 500. Such pixel attribute data preferably is calculated based upon the rate of change in attribute data from the initial pixel in the stripe 500 (i.e., the gradient data). Accordingly, attribute data for the first pixel is not directly utilized. A method similar to that shown in FIG. 10 may be utilized, but utilizing the initial pixel as the reference pixel.

It then is determined at step 906 if the current stripe 500 is the last stripe 500 in the triangle for the rasterizer 214 to process. If it is the last stripe 500, then the process ends. Conversely, if it is not the last stripe 500 in the triangle for the rasterizer 214, then the process continues to step 908 in which the rasterizer 214 skips to the next stripe 500 in its associated subset of stripes 500. For example, in a system with four rasterizers 214, the rasterizer 214 preferably processes every fourth stripe 500. Accordingly, a rasterizer 214 in such an exemplary system preferably skips to a stripe 500 that is four stripes 500 to the right of the stripe 500 that such rasterizer 214 just processed. The process then loops back to step 902 in which the initial pixel attribute data for the current stripe 500 is calculated.

In preferred embodiments, the preferred rasterization process shown in FIG. 9 is executed in parallel by each rasterizer 214 in the system. This improves processing speed, thus improving system performance. Moreover, although operating in parallel, each processor preferably calculates attribute data at a rate of one pixel at a time.

In some embodiments, the rasterizer 214 may calculate the initial pixel attribute data for each initial pixel in its subset of stripes 500 prior to calculating pixel attribute data for the remaining stripes 500 in any stripe 500. More particularly, step 902 is repeated for each stripe 500 in the associated subset of stripes 500 prior to executing step 904 for any of the stripes 500.

FIG. 10 shows a preferred method used by a rasterizer 214 for calculating pixel attribute data for a single pixel from a reference pixel in a stripe 500. The reference pixel may be the first pixel in the first stripe 500, or an initial pixel in any subsequent stripe 500. The process begins at step 1000 in which the rasterizer 214 receives reference pixel attribute data and gradient data from the bus 212. The process then continues to step 1002 in which the location of the pixel to be processed is determined. The total amount of change of attribute data for that pixel then is calculated (step 1004). To that end, the coordinates of the pixel are used by the gradient attribute functions to determine a value representing the total change from the reference pixel. The process then continues to step 1006 in which the value representing the total change from the reference pixel is added to the attribute value of interest of the reference pixel. For example, if the red attribute of a given pixel is being determined, then the value representing the total change of the red shade from the reference pixel to the given pixel is added to the red attribute value of the reference pixel. The below equation summarizes this pixel attribute calculation:

PIXEL ATTRIBUTE VALUE (reference pixel attribute value)+
(value of total change for the attribute from the reference pixel)

Figure 11:
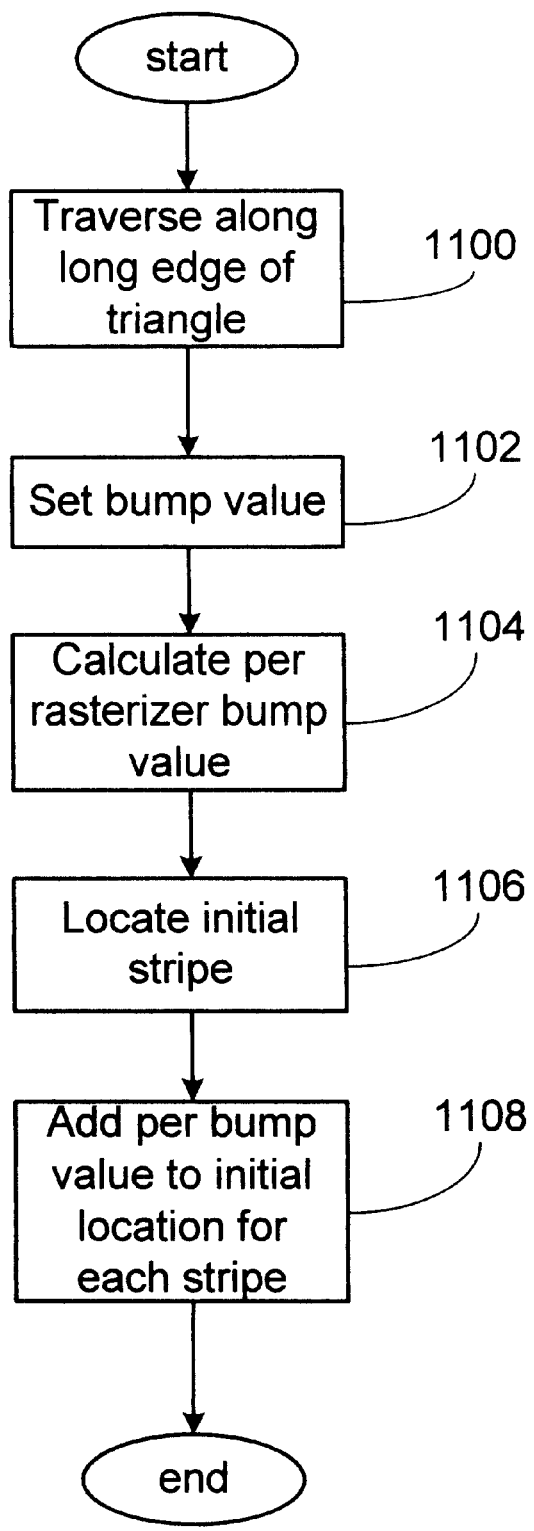
FIG. 11 shows a preferred process utilized by one rasterizer for locating its respective set of initial pixels.

When a rasterizer 214 determines the initial pixel attribute values of the initial pixel in each stripe 500 for the process shown in FIG. 9 (i.e., when executing step 902), it is preferred that the rasterizer 214 locate the initial pixel in as few clock cycles as possible. Use of fewer clock cycles improves system speed and performance. FIG. 11 shows a preferred process utilized by one rasterizer 214 for locating its respective set of initial pixels. This process preferably is executed by each rasterizer 214 in the system. The process begins at step 1100 in which one of the rasterizers 214 determines an incremental sloped distance between each initial pixel in all of the stripes 500 in the triangle by traversing along the longest edge of the triangle (i.e., with a slope defined by the longest edge) from the first pixel in the first stripe 500 to the next pixel located in the X direction. Any one of the rasterizers 214 may determine this value, which is referred to herein as the "bump" value (step 1102). Alternatively, the bump value may be calculated from any initial pixel to its immediately contiguous initial pixel to the left or right (i.e., in the scan direction) of the initial pixel. In preferred embodiments, the first rasterizer 214 performs this calculation. It should be noted that the bump value is a distance along the longest edge of the triangle and thus, in many cases, has a slope value associated with it. For example, with reference to FIG. 5, the rasterizer 214 begins at pixel A and traverses along edge E toward the other stripes 500 until it locates pixel B. This may be performed in the "C" programming language by means of either the "CEIL" function (if the longest edge is at the bottom of the triangle, as in FIG. 5) or the "FLOOR" function (if the longest edge of the triangle is at the top of the triangle such as, for example, if the triangle in FIG. 5 were rotated 180 degrees).

The process continues to step 1104 in which the per rasterizer bump value is calculated. This may be performed by multiplying the bump value by the number of rasterizers 214. In a four rasterizer system, such as that in FIG. 5, the bump value is multiplied by four. The initial stripe 500 for the rasterizer 214 performing the processes then is located at step 1106. To that end, the rasterizer 214 may traverse along the long edge of the triangle a set distance that is based upon both the bump value, and the location of the set of stripes 500 processed by such rasterizer. For example, if such rasterizer 214 is the second of four rasterizers 214 (FIG. 5), then the second stripe 500 is the initial stripe 500 for the rasterizer 214 in issue (i.e., directly next to the first stripe 500). Once the initial pixel is located for that stripe 500 (based upon the bump value), the rasterizer 214 may locate each of its other initial pixels for its other stripes 500 by adding the per rasterizer bump value to each of the initial pixel locations for each of its stripes 500 (step 1108). For example, the per rasterizer pixel value may be added to the pixel location value of the initial pixel in the second stripe 500 to locate the initial pixel in the sixth stripe 500. In a similar manner, the initial pixel in the tenth stripe 500 may be located by adding the per rasterizer bump value to the initial pixel location value in the sixth stripe 500.

As discussed above, data in each of the frame buffers 218 ultimately is displayed upon the display device via a buffer swap. To effectuate this, each rasterizer 214 (with its associated resolvers 216 and frame buffers 218) includes an associated back end unit 234 for removing frame buffer information and displaying it on the display device. See, for example, copending U.S. patent application Ser. No. 09/354, 462 entitled, "APPARATUS AND METHOD OF DIRECTING GRAPHICAL DATA TO A DISPLAY DEVICE," naming inventors Michael Potter and Clifford Whitmore, filed on even date herewith, the disclosure of which is incorporated herein, in its entirety, by reference. Such patent application shows additional details of the back end units 234 that may be utilized in accord with preferred embodiments of the invention.

FIG. 2B schematically shows a preferred set of back end units 234 for displaying frame buffer information on the display device. The set of back end units 234 includes a master back end unit 236 and a plurality of slave back end units 238. Among other things, the master back end unit 236 includes a screen refresh module 240 for retrieving digital frame buffer data from its associated frame buffer 218 via the associated resolvers 216, a master RAMDAC 242 (random access memory digital to analog converter) for performing gamma correction, digital to analog conversion, and synchronization timing functions, and a video timing generator 244 for generating timing signals for each of the aforementioned master back end unit 236 elements and the display device. The master RAMDAC 242 preferably includes a phase locked loop 246 for creating a timing signal that is transmitted to a timing buffer 248 memory on the graphics accelerator 200. The timing buffer 248 is coupled with each of the back end units for delivering synchronized timing signals to each of the slave units 238. The cooperation of each of these elements is discussed in greater detail below with reference to FIG. 12.

Each of the slave back end units 238 similarly includes a screen refresh module 240, a RAMDAC 242, and video timing generator 244. The RAMDAC 242 of each slave unit 238 preferably is coupled to the master RAMDAC 242. This coupling may be either via a direct input into the master RAMDAC 242, via a single video bus, or serially via other slave RAMDACs 242. As shown below, in preferred embodiments, only the video timing generator 244 of the master back end unit 236 is coupled with the display device. The video timing generator 244 of the slave units 238, however, are not coupled with the display device. Each screen refresh module 240 is coupled to its associated set of resolvers 216 for retrieving data from its associated frame buffer 218. Only one set of resolvers 216, however, is shown in FIG. 2B. That set of resolvers 216 is associated with the master back end unit 236.

Figure 12:
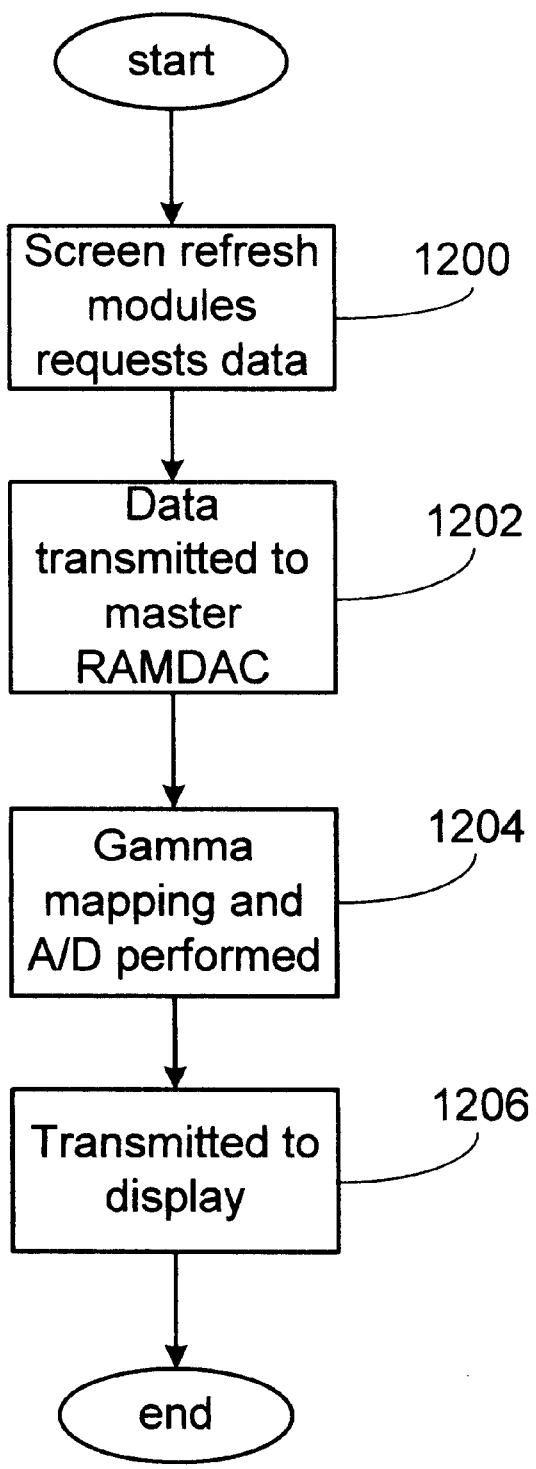
FIG. 12 shows a preferred process utilized by the back end module shown jn FIG. 2B for retrieving graphical data from the frame buffer and displaying such graphical data on a display device FIG. 13 schematically shows a preferred embodiment of a cursor that is configured so that an image that it is covering is visible through the cursor.
Figure 13:
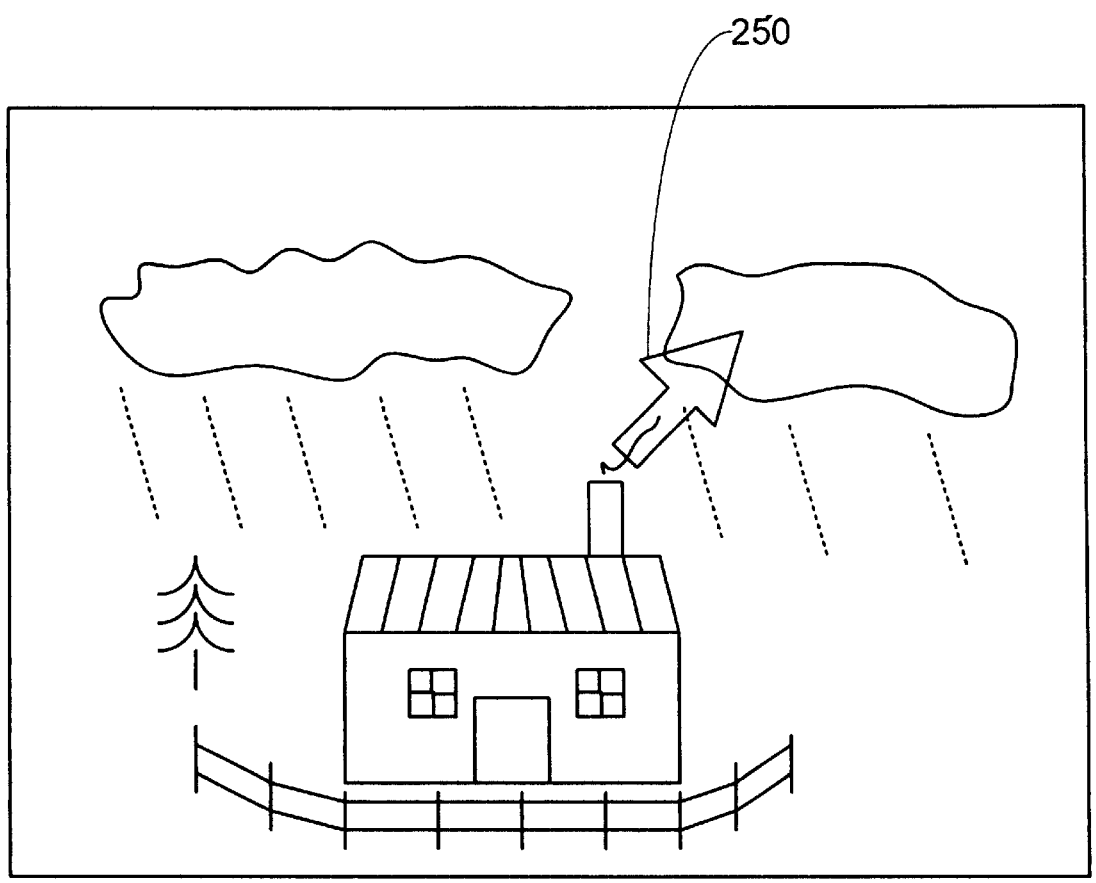

FIG. 12 shows a preferred process utilized by the back end module shown in FIG. 2B for retrieving graphical data from each of the frame buffers 218 and displaying such graphical data on the display device. The process begins at step 1200 in which the screen refresh modules 240 of each back end unit requests data from each respective frame buffer 218 via respective resolvers 216. This preferably is timed by synchronizing each of the individual video timing generators 244.

The process then continues to step 1202 in which the data retrieved by each of the slave back end units 238 is transmitted to the master RAMDAC 242. Unlike the master RAMDAC 242, in preferred embodiments, none of the slave RAMDACs 242 performs gamma correction or digital to analog conversion. Instead, each of the slave RAMDACs 242 merely retrieve their respective data and transmit such data to the master RAMDAC 242. In alternative embodiments, each of the slave back end units 238 transmits converted data.

As noted above, the slave RAMDACs 242 are configured to receive a timing signal from the phase locked loop 246, via the timing buffer 248, to synchronize data transmission to the master RAMDAC 242. The timing buffer 248 preferably is physically located on the accelerator in a position that minimizes signal propagation delays across the accelerator. In preferred embodiments, the timing buffer 248 is located nearest the slave back end units 238 that are physically located in the middle of each of the other back end units. In any event, each trace connected between the timing buffer 248 and each respective back end unit preferably has a substantially equal length to ensure a substantially identical propagation delay between such points. The combination of a timing buffer 248 and a phase locked loop 246 preferably is utilized instead of an external clock since a buffer is much less expensive. In alternative embodiments, an external clock may be used.

The process then continues to step 1204 in which the master RAMDAC 242 processes all of the data received from the slave units 238 and its associated screen refresh module 240. Such processing preferably includes gamma correction (a/k/a gamma mapping, which is well known in the art), and digital to analog conversion for display on the (analog) display device. The processed data then is transmitted to the display device in step 1206, thus completing the process.

In preferred embodiments, the master RAMDAC 242 transmits one pixel of attribute data to the display device during every clock cycle. In a similar manner, each slave back end unit 238 also can transmit data for one pixel of attribute data every clock cycle to the master RAMDAC 242. In a system with four back end units, for example, every processor transmits one pixel of data to the master RAMDAC 242 every fourth clock cycle. In preferred embodiments, however, each slave RAMDAC 242 transmits partial data for one pixel to the master RAMDAC 242 during every clock cycle. For example, in the previously discussed exemplary four unit system, every slave RAMDAC 242 transmits one fourth of a pixel's attribute data to the master RAMDAC 242 every clock cycle. If complete pixel attribute data is contained in a thirty-two bit word, then every slave RAMDAC 242 transmits eight bits of data each clock cycle. Upon receipt by the master RAMDAC 242, the fractional data is processed in a processing pipeline and transmitted to the display device. In alternative embodiments, the fractional data is stored in a memory location until the complete pixel attribute data is received. Once received, the data may be processed as discussed above.

In preferred embodiments, the plurality of back end units may be utilized to display data across two or more display devices. This may be useful, for example, when an image may be enlarged or dragged across display devices. In such case, an application program delivers instructions to the accelerator indicating that an image is to be displayed across two displays. The plurality of back end units then divides up into the number of display devices to be utilized. For example, if two displays are to be utilized, then the back end units divide the back end into two sets of back end units. Each of the two sets includes a master back end unit 236. Processing then continues in accord with preferred embodiments of the invention. The two sets of back end units thus are utilized to display the image over the two display devices.

Preferred embodiments of the graphics accelerator 200 may be utilized to perform a plurality of additional functions. For example, a cursor 250 may be displayed so that an image that it is covering is visible through the cursor 250 (e.g., see FIG. 13). To that end, memory (e.g., read only memory or conventional non-volatile memory) may be included on the accelerator for storing a look-up table having cursor display data. The cursor display data includes data for drawing the cursor 250 on the display device as a function of the cursor location.

Figure 14:
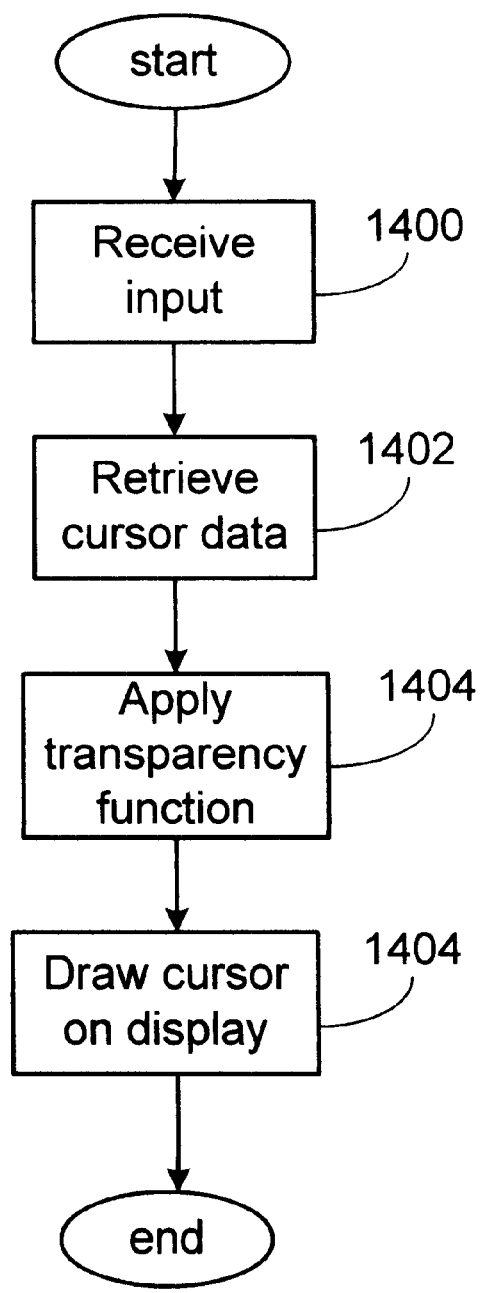
FIG. 14 shows a preferred process of producing a cursor as shown in FIG. 13.

FIG. 14 shows a process for displaying such a cursor 250. The process begins at step 1400 in which coordinate data of the cursor 250 is received from an input device. The input device may be the mouse or keyboard of the computer system. The process then continues to step 1402 in which the cursor data is retrieved from the look-up table in memory. It should be noted that other methods of storing the data in memory may be used such as, for example, storing the data as a series of records in a database.

Once retrieved, the cursor data may be processed by a transparency function (step 1404). Implemented in either in hardware or software (discussed below), the transparency function produces output display data for display on the display device. Accordingly, the process concludes (step 1406) by drawing the output display data to the display device.

The transparency function preferably is a function of a preprogrammed transparency value (e.g., an alpha value when using OPENGLT"). To that end, the output display data preferably is calculated as shown below:

OUTPUT DISPLAY DATA=((1−ALPHA)* NORMAL VIDEO)= (ALPHA * CURSOR DATA)

where:
ALPHA=transparency (a value between zero and one);
NORMAL VIDEO=the background information that is partially covered by the cursor.
CURSOR DATA=cursor data retrieved from the look-up table.

Figure 15A:
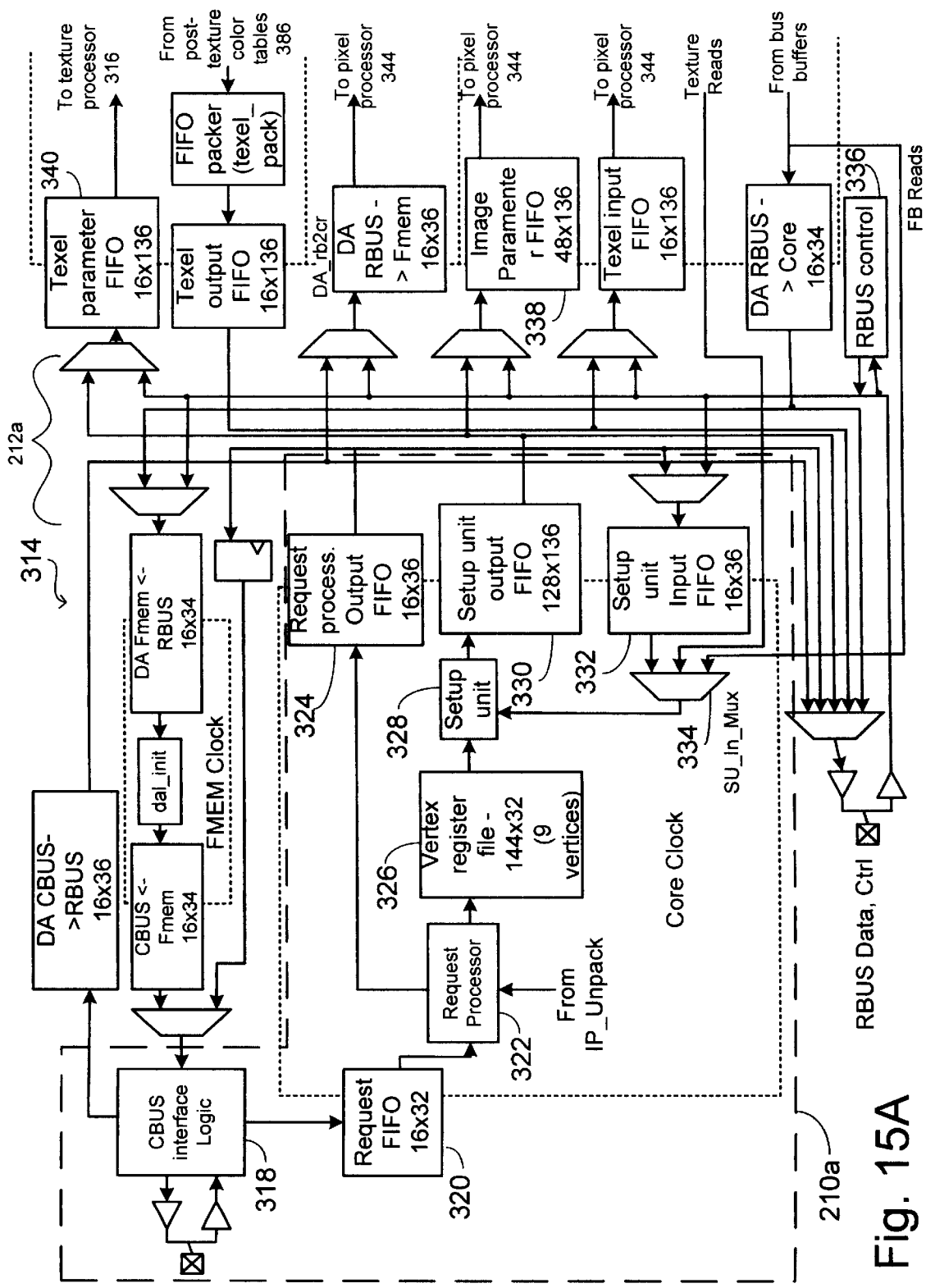
FIGS. 15A and 15B schematically show details of a single attribute processor.
Figure 15B:
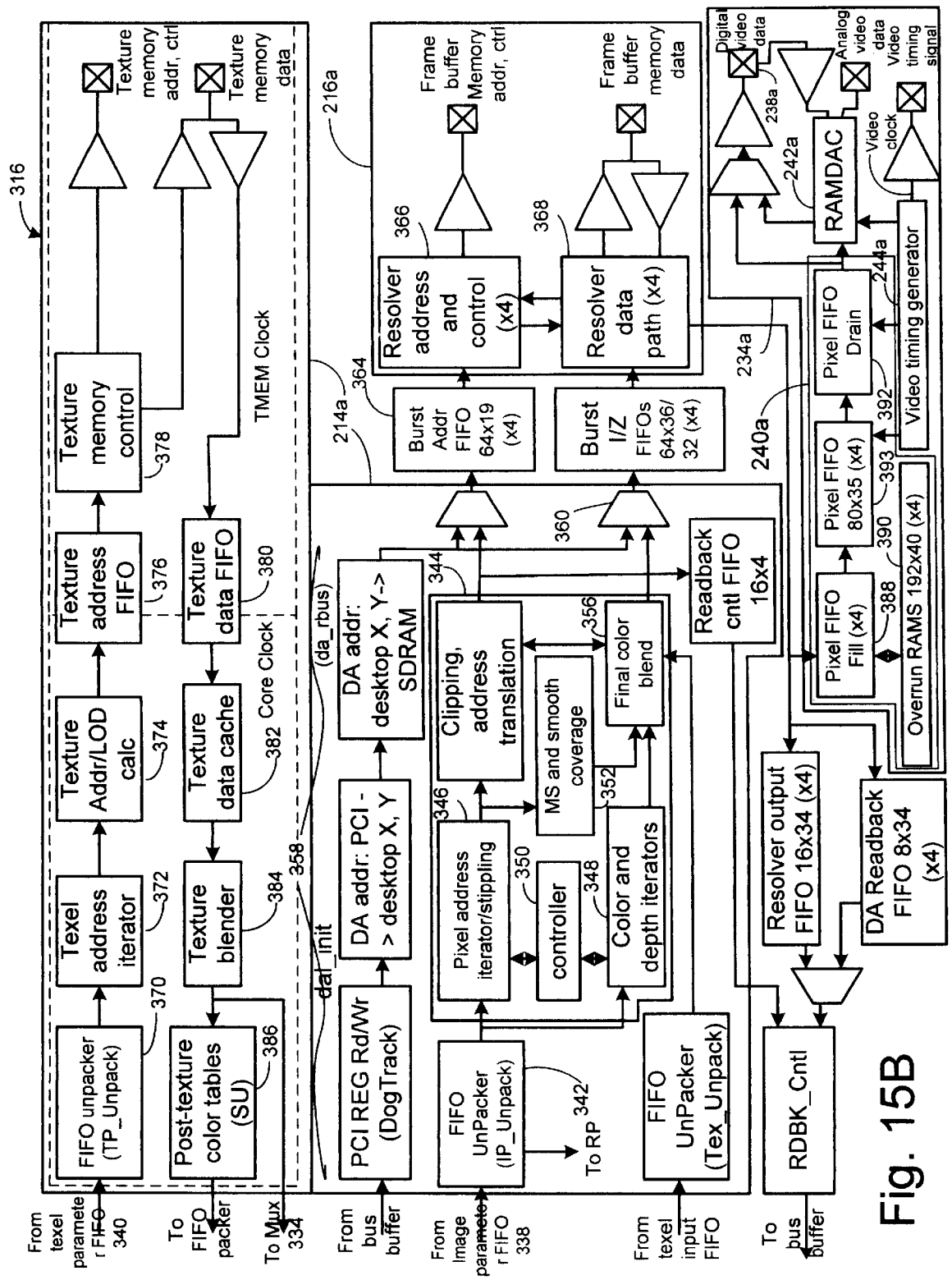

FIGS. 15A and 15B schematically show details of a single attribute processor 314. As noted herein, a single attribute processor 314 can operate with the geometry accelerator stage of the graphics card to adequately process graphical image data. It is preferred, however, that multiple attribute processors 314 cooperate to share the pixel rasterization process. To that end, accompanying driver software preferably is utilized to enable additional attribute processors 314 to be added or removed from the graphic accelerator 200. In preferred embodiments, the driver software includes a graphical user interface ("GUI," not shown) for configuring the graphics accelerator 200. Among other things, the GUI may include a field for entering the total number of attribute processors 314 in the system. Data thus is processed by the graphics accelerator 200 based upon the total number of attribute processors 314 in the system.

The attribute processor 314 includes many of the same elements that are shown in the graphics accelerator 200 of FIGS. 2A and 2B. Accordingly, the attribute processor 314 includes a gradient unit 210a for producing gradients, an accelerator bus 212a for distributing data to other attribute processors and other elements of the attribute processor 314, a rasterizer 214a for rasterizing pixels, resolvers 216a for storing data in the frame buffers 218, and a back end unit 234a for both retrieving data from the frame buffers 218, and displaying such retrieved data on the display device 170. The attribute processor 314 also includes a texture processor 3 16 for calculating texture data. Although not previously shown, the texture processor 316 is considered to be a part of the rasterization stage 214 shown in FIG. 2A. Each of these elements are discussed below in greater detail. Details of the operation of these elements are discussed above and thus, their discussion below may be somewhat repetitive. Their operation nevertheless is discussed below to show the operation of many of the sub-elements that provide the desired function of the elements under consideration.

The gradient unit 210a includes a CBUS interface logic unit 318 for receiving addressed input data from the system bus 130, and directing such data to the appropriate graphics processing pipeline. The input data may be one of three types of data. Namely, the input data may be graphical request data, graphics accelerator configuration data, or direct frame buffer access data. The CBUS interface logic unit 318 determines the type of data received by reading an address field in the input data. Once the data type is determined, the CBUS interface logic unit 318 forwards the input data to the next appropriate stage for processing. If the input data is not graphics request data, then it is forwarded to one of a plurality of bus buffers (discussed below) for transmission to the accelerator bus 212*a*. If, however, the input data is graphics request data, then it is forwarded to a request first-in, first-out ("FIFO") buffer 320. As noted above, the graphics request data at this processing stage is comprised of triangle strips in the form of coordinate data (i.e., X, Y, 2 information) and normal data and thus, is stored as such.

The request code then is retrieved from the request buffer 320 by a request processor 322 that further processes the data. If the request data does not require gradient data to be calculated (e.g., a selected part of the display device 170 is to be a single color), then the request processor 322 forwards the data to a request processor output buffer 324 for direct transmission to the accelerator bus 212*a*. Conversely, if the request data requires gradient data to be calculated, then the request processor breaks the triangle strips into a stream of thirty-two bit data records. As noted above, the stream of data records preferably include a header indicating both the type of data following the header, and the identity of a terminator record (e.g., Not a Number and the noted single-bit terminator flag) indicating the end of the data being received. The request processor 322 then forwards the processed request data into a vertex register 326. In preferred embodiments, the vertex register 326 is sized to store data for nine vertices that each are represented by fourteen thirty-two bit words. Accordingly, the vertex register 326 is sized to have one hundred forty-four locations that each are thirty-two bits wide.

A gradient setup unit 328 then retrieves the data vertex data from the vertex register 326 and calculates the gradient data. Among other things, setup unit 328 may include floating point multipliers, floating point adders, and matrix multipliers to calculate the gradient data. The gradient data may include the gradients indicating the rate of change of pixel attributes across a triangle, and initial parameters (e.g., attribute data for an initial pixel) for calculating pixel attribute data. Once calculated, the gradient data is stored in a setup FIFO buffer 330 for transmission to the accelerator bus 212*a*. In preferred embodiments, the gradient data is packed into a series of one hundred thirty-six bit data packs. The data in a data pack is stored in accord with a preselected format. For example, a first set of bits may be reserved for a first type of data, while a second set of bits may be reserved for a second type of data.

The gradient unit 210*a* also includes a setup input buffer 332 for receiving input data from the accelerator bus 212*a*. For example, the setup unit 328 may include a math processing unit to perform OPENGLT" related imaging functions for data received from the accelerator bus 212*a*. Output from the setup input buffer 332 may be forwarded into a 3-1 multiplexer 334, which ultimately forwards the received input data to the setup unit 328.

The accelerator bus 212*a* includes a plurality of input and output buffers, circuit traces for transmitting data, and a bus controller 336. The bus controller 336 has access to all buffers that are part of the accelerator bus 212*a*, and all buffers coupled to the accelerator bus 212*a*. Among other functions, the bus controller 336 determines the type of data to be transmitted across the bus, and routes such data accordingly. When utilized with other attribute processors, the accelerator bus 212*a* of each attribute processor 314 is coupled to form a larger accelerator bus 212*a*. The bus controllers 336 therefore cooperate to transmit data from attribute processor to attribute processor. In preferred embodiments, the bus controllers 336 on the different attribute processors cooperate to execute the token passing processes described above.

One of the buffers that is a part of the accelerator bus 212*a* is an image parameter FIFO buffer 338 that receives gradient data from the gradient unit 210*a*. When multiple attribute processors are utilized on a single graphics accelerator 200, then each image parameter FIFO buffer 338 receives a copy of all gradient data produced by each setup unit 328 on each attribute processor. The image parameter FIFO buffer 338 preferably includes forty-eight locations for storing one hundred thirty-six bit wide data packs.

Another buffer that is a part of the accelerator bus 212*a* is a texel parameter FIFO buffer 340. The texel parameter FIFO buffer 340 receives an identical copy of the data received by the image parameter FIFO buffer 338. This texel parameter FIFO buffer 340 preferably includes sixteen locations for storing one hundred thirty-six bit wide data packs.

Data from the accelerator bus 212*a* is received by the rasterizer 214*a* and its texture processor 316. As noted above, the rasterizer 214*a* calculates attribute values for the pixels (e.g., color, transparency, etc . . .), while its associated texture processor 316 performs texture operations. To that end, the rasterizer 214*a* includes a rasterization FIFO unpacker 342 that is configured to retrieve the data packs from the image parameter FIFO buffer 338, and format it into a simpler format for processing (i.e., unpack the data packs).

As noted above, configuration data is transmitted from the interface logic unit 3 18 in the gradient unit 210*a*, to the accelerator bus 212*a*, and ultimately, to each rasterizer 214*a*. Accordingly, the unpacker 342 is preconfigured by previously received configuration data to cause the rasterizer 214*a* to process selected stripes only. This process of processing selected stripes is discussed above.

Once unpacked by the unpacker 342, the formatted data is forwarded to a pixel rasterization portion 344 for rasterizing pixels in the selected stripe(s). The rasterization portion 344 includes a pixel address iterator 346 that determines the coordinate location of a pixel on the display 170 to be processed (e.g., via the above noted delta bump method), a color and depth iterator 348 that determines pixel attributes for a pixel located at the display coordinates provided by the pixel address iterator 346, and a controller 350 for forwarding the coordinate data from the pixel address iterator 346 to the color and depth iterator 348. Accordingly, the address iterator 346 and color and depth iterator 348 cooperate to rasterize the pixels on the display device 170 in a pixel-by-pixel manner. The rasterization portion 344 also includes a multisampling and smoothing module 352 for performing antialiasing and smoothing operations on the pixels, a clipping processor 354 for performing clipping processes, and a color blending unit 356 for blending the output from each of the other elements in the rasterization portion 344 with texture data received from the texture processor 316. In preferred embodiments, the multisampling module 352 operates in a manner similar to that described in copending U.S. patent application Ser. No. 09/329,557, filed on Jun. 10, 1999, and entitled, "SYSTEM FOR REDUCING ALIASING ON A DISPLAY DEVICE," the disclosure of which is incorporated herein, in its entirety, by reference. In alternative embodiments, the multisampling module 352 operates in accord with conventional antialiasing processes. In a similar manner, the clipping processor 354 operates in a manner similar to that disclosed in allowed U.S. patent application Ser. No. 08/926,120, filed Sep. 9, 1997 and entitled, "GRAPHICS PROCESSING WITH EFFICIENT CLIPPING," the disclosure of which is incorporated herein, in its entirety, by reference.

As noted previously, some request data does not require processing by the rasterization portion 344. For example, pass-through data does not require rasterization. Accordingly, the rasterizer 214a further includes a data bypass path 358, with several data processors, for bypassing the rasterization portion 344. Data from the bypass path 358 is used as input into a output multiplexer 360 that also couples with the output from the color blending unit 356. Data from the output multiplexer 360 is forwarded into a burst I/Z FIFO buffer 362 for subsequent retrieval by the resolvers 216a. The data bypass path 358 also couples with a burst address FIFO buffer 364. Data in these two FIFO buffers 362 and 364 consequently is retrieved by the resolvers 216a and stored in the frame buffer 218.

The resolvers 216a preferably include an address and control resolver 366 for retrieving data from the address FIFO buffer 364, and a data resolver 368 for retrieving data from the I/Z FIFO buffer 362. The two resolvers 366 and 368 communicate to store data in the frame buffer 218. The data resolver 368 preferably stores data in the frame buffer 2.8 in the locations specified by the address and control resolver 366. As noted above, the resolvers 366 and 368 preferably include a plurality of subresolvers for more efficiently storing data in the frame buffer 218. For additional details relating to a preferred resolver configuration, see, for example, commonly owned U.S. Pat. No. 5,864,512 entitled, "HIGH SPEED VIDEO FRAME BUFFER USING SINGLE PORT MEMORY CHIPS," the disclosure of which, is incorporated herein, in its entirety, by reference.

The texture processor 316 that, as noted above, receives gradient data from the gradient unit 210a via the accelerator bus 212a, generates texture data for processing by the blending unit 356. To that end, the texture processor 316 includes a texture FIFO unpacker 370 for unpacking data from the texel parameter FIFO buffer 340 in a manner similar to that discussed above, a texel address iterator 372 for determining the coordinate location of a given pixel to receive texture attribute data, a texture level of detail calculator 374 for determining the level of detail of a texture map to apply to the given pixel, a texture address FIFO buffer 376 for storing output from the address calculator 374, and a texture memory controller 378 that retrieves a texture map from the texture buffer 220 (that is coupled to the attribute processor 314).

The texture processor 316 also includes a texture data FIFO buffer 380 for storing the address data, level of detail data, and texture map retrieved from the texture buffer 220. This data is stored temporarily in a texture data cache 382 until retrieved by a texture blender 384 that blends and interpolates to produce an output texture. As known by those skilled in the art, texture map interpolation is performed from a base texture map stored in the texture buffer 220. The texture processor 316 also may include a post-texture color table 386 for producing more refined textures. The output texture attribute data, as noted above, then is forwarded to the color blending unit 356 for further processing.

Texture processing may be performed in accord with conventional texture processing methods. In some embodiments, texture packets may be utilized as discussed in copending U.S. patent application number entitled, "GRAPHICS PROCESSOR WITH TEXTURE MEMORY ALLOCATION SYSTEM," filed on even date herewith and the disclosure of which is incorporated herein, in its entirety, by reference.

The back end unit 234a includes, among other things, a screen refresh module 240a for retrieving digital frame buffer data from the frame buffer 218 via the resolvers, a RAMDAC 242a for performing gamma correction, digital to analog conversion, and synchronization timing functions, and a video timing generator 244a for generating timing signals. The screen refresh module 240a includes a pixel buffer filling unit 388 that requests data from the resolvers 216a for storage in a pixel buffer. A RAM overrun buffer 390 also may be utilized for temporarily storing data that does not require immediate processing. A pixel buffer drain unit 392 also is included to withdraw pixel data from a pixel buffer 393, for transmission to the RAMDAC 242a, and to a video data bus 238a. The video data bus 238a may be coupled with other video data busses on other attribute processors, and/or with a video output for capturing the video output prior to being converted to an analog format. For example, a digital storage media coupled to the video output may be utilized to store the digital video data.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method of displaying a polygon on a horizontal scan display device having a plurality of pixels, the method comprising:

A. dividing the polygon into a plurality of vertical stripes that are transverse to the horizontal scan of the display device;

B. receiving pixel attribute data for a first pixel in a first stripe of the polygon, each of the remaining vertical stripes having an initial pixel that corresponds to the first pixel in the first stripe;

C. receiving gradient data relating to the degree of change of pixel attribute data with respect to the pixel data relating to the first pixel;

D. calculating pixel attribute data for each initial pixel in each stripe in the polygon, the pixel attribute data for each initial pixel being calculated based upon the pixel attribute data for the first pixel and the gradient data; and E. calculating pixel attribute data for each remaining pixel in each stripe based upon the pixel attribute data for the initial pixel in each stripe in the polygon.

2. The method as defined by claim 1 wherein the polygon is a triangle.

3. The method as defined by claim 1 further comprising:

F. calculating pixel attribute data for each remaining pixel in the first stripe based upon both the pixel attribute data for the first pixel in the first stripe and the gradient data.

4. A method of calculating pixel values for a triangle to be displayed on a display device having a plurality of pixels and a scan direction, the pixels being addressable in an X direction and a Y direction, the triangle having a longest edge, the method comprising:

A. providing a first number of processors for calculating pixel attribute data for each pixel in the triangle;

B. dividing the triangle into a set of vertical stripes that are perpendicular to the scan direction of the display device, each stripe originating from the longest edge of the triangle, each processor calculating attribute data for different sub-sets of the set of stripes, no two processors processing the same stripe;

C. receiving attribute data for an initial pixel in a first stripe of the set of stripes;

D. traversing along the longest edge of the triangle for a first distance until a first pixel in the X direction of a next contiguous stripe is detected;

E. multiplying the first distance by the first number of processors to produce a processor bump value; and F. controlling each processor to calculate attribute data for pixels in each respective sub-set of stripes, the attribute data being calculated based upon the processor bump value and the received attribute data for the initial pixel.

5. The method as defined by claim 4 wherein the scan direction of the display device is horizontal.

6. The method as defined by claim 4 wherein step C includes the step of:

C1. receiving gradient data for the triangle, the gradient data being based upon the attribute data for the initial pixel.

7. The method as defined by claim 6 wherein the attribute data for the pixels in each respective sub-set of stripes is calculated based upon the gradient data.

8. The method as defined by claim 4 wherein each stripe has a width in the X direction of one pixel.

9. The method as defined by claim 4 wherein a first processor calculates attribute data for the first stripe, the first processor calculating attribute data for a first sub-set of stripes that includes the first stripe, step F comprising the steps of:

F1. controlling the first processor to calculate initial pixel attribute data for initial pixels in all of the stripes in the first sub-set of stripes except for the first stripe, the initial pixel data being calculated based upon the processor bump value and the received attribute data for the initial pixel; and F2. controlling the first processor to calculate each of the other pixel attribute data values in each stripe based upon the initial pixel attribute data calculated for the initial pixel in each respective stripe.

10. The method as defined by claim 9 wherein a second processor calculates attribute data for a second sub-set of stripes, step F further comprising:

F3. controlling the second processor to calculate initial pixel attribute data for initial pixels in all of the stripes in the second sub-set of stripes, the attribute data for the initial pixels being based upon the processor bump value and the received attribute data for the initial pixel.

* * * * *

UNITED STATES PATENT AND TRADEMARK OFFICE
CERTIFICATE OF CORRECTION

PATENT NO.    : 6,535,216 B1
DATED         : March 18, 2003
INVENTOR(S)   : James L. Deming et al.

It is certified that error appears in the above-identified patent and that said Letters Patent is hereby corrected as shown below:

<u>Column 1,</u>
Line 12, delete ";" and insert -- , -- in its place.

<u>Column 18,</u>
Line 58, delete "VALUE" and insert -- VALUE = -- in its place.

Signed and Sealed this

Twenty-second Day of July, 2003

JAMES E. ROGAN
*Director of the United States Patent and Trademark Office*